(12) United States Patent
Youn et al.

(10) Patent No.: US 12,089,078 B2
(45) Date of Patent: Sep. 10, 2024

(54) PMF SUPPORT SCHEME FOR MA PDU SESSION

(71) Applicant: LG Electronics Inc., Seoul (KR)

(72) Inventors: Myungjune Youn, Seoul (KR); Hyunsook Kim, Seoul (KR); Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 17/606,556

(22) PCT Filed: Apr. 22, 2020

(86) PCT No.: PCT/KR2020/005289
§ 371 (c)(1),
(2) Date: Oct. 26, 2021

(87) PCT Pub. No.: WO2020/218807
PCT Pub. Date: Oct. 29, 2020

(65) Prior Publication Data
US 2022/0182861 A1    Jun. 9, 2022

(30) Foreign Application Priority Data

Apr. 26, 2019 (KR) .................. 10-2019-0049055
May 7, 2019 (KR) .................. 10-2019-0053302

(51) Int. Cl.
*H04W 24/08* (2009.01)
(52) U.S. Cl.
CPC .................. *H04W 24/08* (2013.01)
(58) Field of Classification Search
CPC .................................................. H04W 24/08
USPC ........................................................ 370/329
See application file for complete search history.

(56) References Cited

FOREIGN PATENT DOCUMENTS

WO    WO2019032972    2/2019

OTHER PUBLICATIONS

3GPP, "3rd Generation Partnership Project; Technical Specification Group Services and System Aspects; System Architecture for the 5G System; Stage 2 (Release 16)," TS 23.501 V16.0.2, Apr. 2019, 316 pages.
3GPP, "Release 16," TS 24.501 V16.0.2, Mar. 2019, 480 pages.
Huawei, HiSilicon, "Addition of ATSSS performance measurement Procedures, "S2-1904128, Change Request, Presented at 3GPP TSG-SA WG2 Meeting #132, Apr. 8-12, 2019, Xi'an, China, 3 pages.
Motorola Mobility et al., "PMF procedures between UE and UPF," S2-1901525 (revision of S2-19xxxxx), Presented at SA WG2 Meeting #131, Feb. 25-Mar. 1, 2019, Santa Cruz, Tenerife, Spain, 6 pages.

*Primary Examiner* — Peter G Solinsky
(74) *Attorney, Agent, or Firm* — Fish & Richardson P.C.

(57) ABSTRACT

Provided in one disclosure in the present specification is a multi-access (MA) protocol data unit (PDU) session method using user equipment (UE). The method can comprise a step of transmitting a first request message for a performance measurement function (PMF) binding request to a PMF layer of a user plane function (UPF) node on the basis of PMF address information about the UPF node included in measurement assistance information (MAI). The PMF binding request can be performed according to quality of service (QoS) flow. The method can comprise a step of receiving a PMF binding response message from the PMF layer of the UPF node. The PMF binding response message can include a reflective QoS indication (RQI).

15 Claims, 35 Drawing Sheets

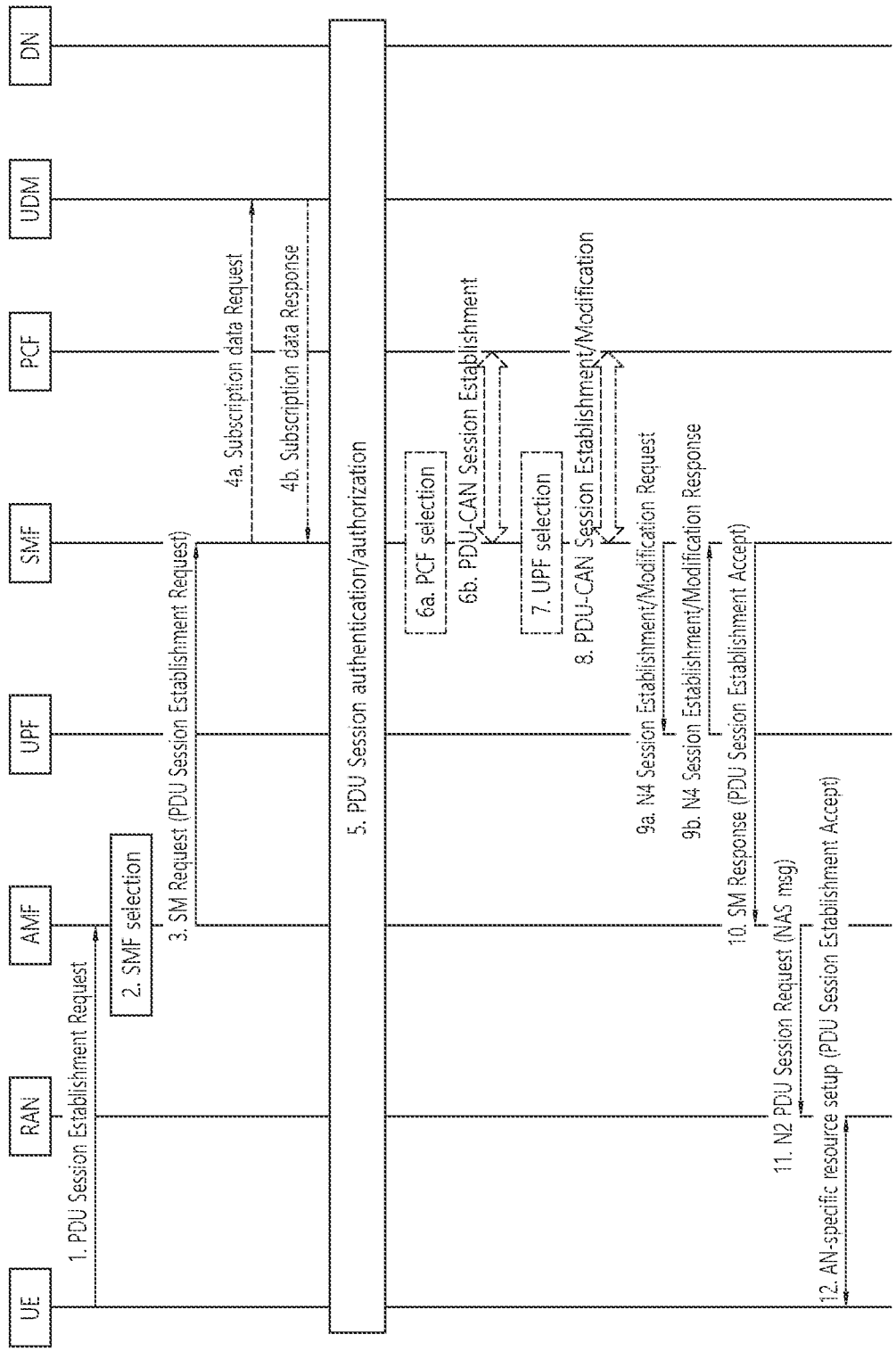

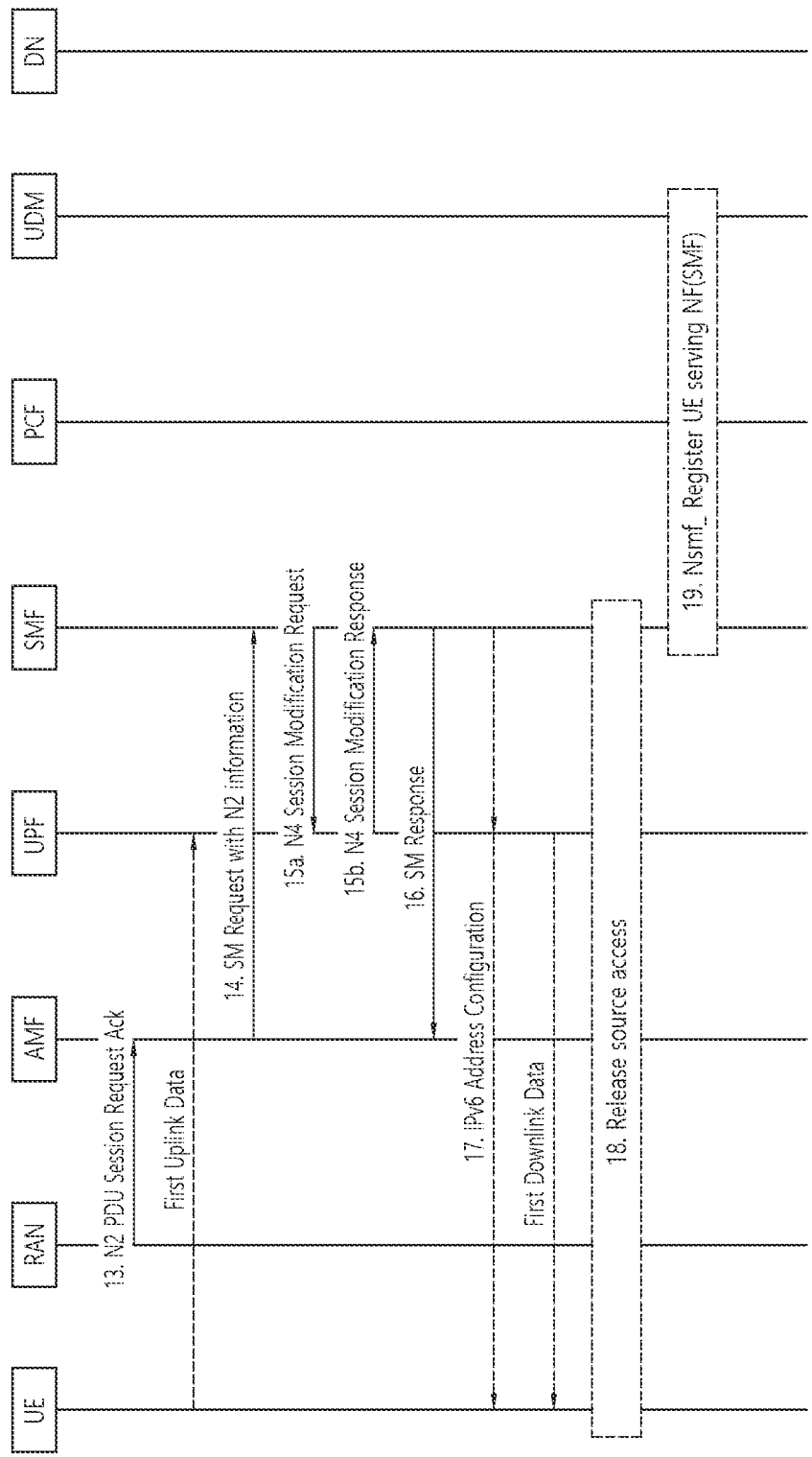

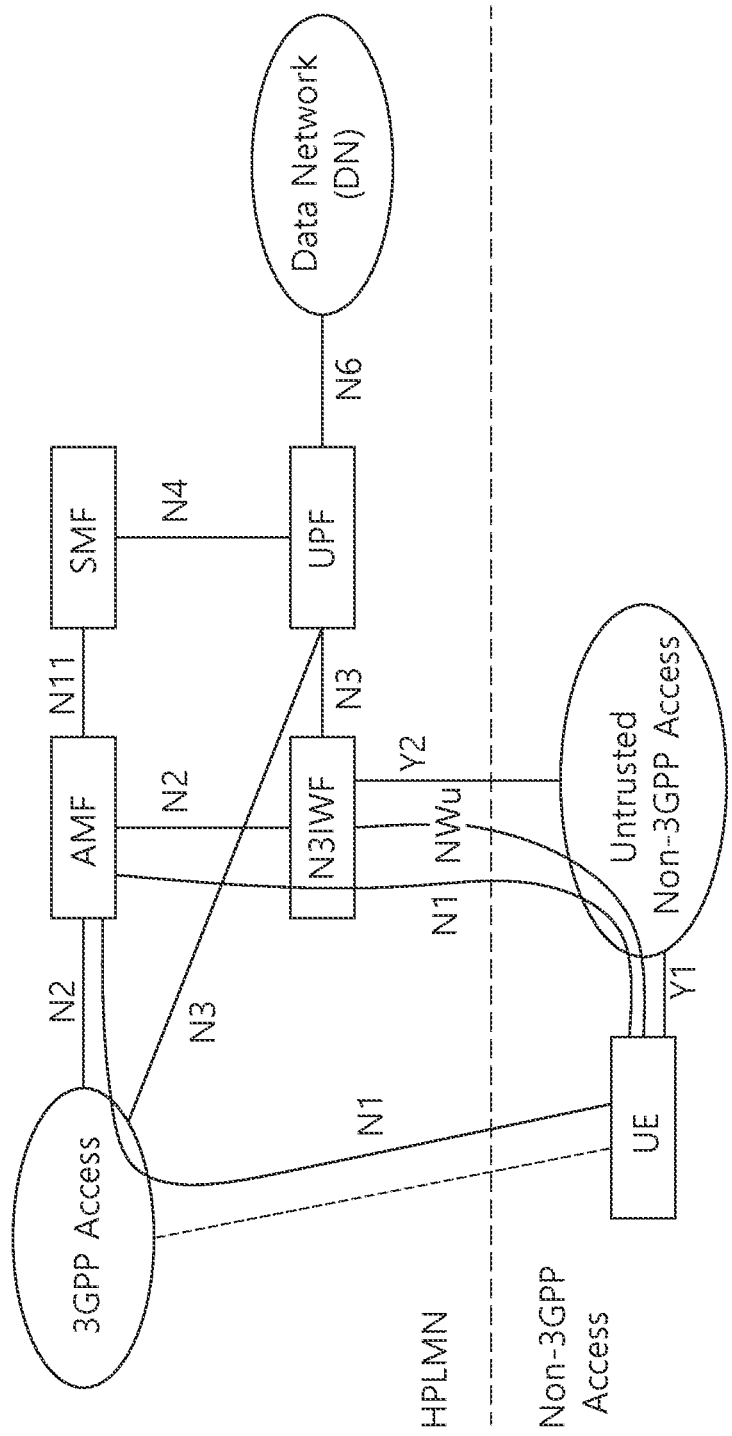

PMF SUPPORT SCHEME FOR MA PDU SESSION

CROSS-REFERENCE TO RELATED APPLICATIONS

This application is a National Stage application under 35 U.S.C. § 371 of International Application No. PCT/KR2020/005289, filed on Apr. 22, 2020, which claims the benefit of Korean Patent Application No. 10-2019-0049055, filed on Apr. 26, 2019 and Korean Patent Application No. 10-2019-0053302, filed on May 7, 2019. The disclosures of the prior applications are incorporated by reference in their entirety.

TECHNICAL FIELD

The present specification relates to mobile communications.

BACKGROUND

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 1 is a structural diagram of a next-generation mobile communication network.

The 5G Core network (5GC) may include various components, part of which are shown in FIG. 1, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN).

The UE 10 may be provided with a data service even through untrusted non-3GPP access, e.g., a Wireless Local Area Network (WLAN). In order to connect the non-3GPP access to a core network, the N3IWF 59 may be deployed.

FIG. 2 is an exemplary diagram illustrating a predicted structure of a next generation mobile communication in terms of a node.

Referring to FIG. 2, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 2, a UE can simultaneously access two data networks using multiple Protocol Data Unit (PDU) sessions.

FIG. 3 is an exemplary diagram illustrating an architecture for supporting simultaneously access two data networks.

FIG. 3 illustrates an architecture that allows the UE to simultaneously access two data networks using one PDU session.

Reference points shown in FIGS. 2 and 3 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.
   NAS procedures related to AMF include the following.
   Registration management and access management procedures. AMF supports the following functions.
   Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
   The NAS entity for the MM creates a NAS-MM message that derives how and where to deliver an SM signaling message through a security header representing the NAS transmission of SM signaling and additional information on a received NAS-MM.
   Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

A Multi-Access (MA) PDU session using both 3GPP access and non-3GPP access may be used.

A MA PDU session may be created by bundling two separate PDU sessions established on two accesses.

The MA PDU session may be managed according to an Access Traffic Steering, Switching and Splitting (ATSSS) rules.

In order to support ATSSS, a function called Performance Measurement Function (PMF) may be defined. Both the UE and the UPF may include a PMF layer (or entity) to support the PMF. The UE and the UPF may measure a Round Trip Time (RTT) by exchanging a PMF-Echo-Request message and a PMF-Echo-Response message through the PMF layer (or entity). However, the PMF layer (or entity) has been discussed only conceptually, and there is technical ambiguity because concrete implementation methods have not been studied.

SUMMARY

Accordingly, an object of the present specification is to propose a method for solving the above-described problems.

In order to solve the above-described problems, a disclosure of the present specification provides a method for Multi Access (MA) Protocol Data Unit (PDU) session by a User Equipment (UE). The method may include, based on a Performance Measurement Function (PMF) address information of a User Plane Function (UPF) node included in Measurement Assistance Information (MAI), transmitting a first request message for a PMF binding request to a PMF layer of the UPF node. The PMF binding request may be performed for each Quality of Service (QoS) flow. The method may include receiving a PMF binding response message from the PMF layer of the UPF node. The PMF binding response message may include a Reflective QoS Indication (RQI). The method may include generating a derived QoS rule based on the RQI; and based on the derived QoS rule, performing a PMF Echo procedure via a QoS flow for which measurement is required.

In order to solve the above-described problems, a disclosure of the present specification provides a method for Multi Access (MA) Protocol Data Unit (PDU) session by a User Plane Function (UPF) node. The method may include transmitting Measurement Assistance Information (MAI) including Performance Measurement Function (PMF) address information of the UPF node to a Session Management Function (SMF) node; receiving a first request message for a PMF binding request from a User Equipment (UE). The PMF binding request may be performed for each Quality of Service (QoS) flow. The method may include transmitting a PMF binding response message to the UE. The PMF binding response message may include a Reflective QoS Indication (RQI), which is used by the UE to create a derived QoS rule. The method may include, based on the derived QoS rule, performing a PMF Echo procedure via a QoS flow for which measurement is required.

In order to solve the above-described problems, a disclosure of the present specification provides a method for Multi Access (MA) Protocol Data Unit (PDU) session by a Session Management Function (SMF) node. The method may include receiving a PDU session establishment request message from a User Equipment (UE); receiving Measurement Assistance Information (MAI) including Performance Measurement Function (PMF) address information from a User Plane Function (UPF) node; and transmitting a PDU session establishment accept message including the MAI including address information of the UPF to the UE.

In order to solve the above-described problems, a disclosure of the present specification provides a non-volatile computer readable storage medium storing instructions. The non-volatile computer readable storage medium includes instructions.

The instructions, based on being executed by at least one processor, make at least one processor perform operations. The operations may include, based on a Performance Measurement Function (PMF) address information of a User Plane Function (UPF) node included in Measurement Assistance Information (MAI), transmitting a first request message for a PMF binding request to a PMF layer of the UPF node. The PMF binding request may be performed for each Quality of Service (QoS) flow. The operations may include receiving a PMF binding response message from the PMF layer of the UPF node. The PMF binding response message may include a Reflective QoS Indication (RQI). The operations may include generating a derived QoS rule based on the RQI; and based on the derived QoS rule, performing a PMF Echo procedure via a QoS flow for which measurement is required.

According to the disclosure of the present specification, it is possible to solve the problems of the prior art.

BRIEF DESCRIPTION OF THE DRAWINGS

FIGS. 6a and 6b are a signal flowchart illustrating an exemplary PDU session establishment procedure.

FIG. 8a to FIG. 8f show architectures for routing data to non-3GPP access.

DETAILED DESCRIPTION

Figure 1:
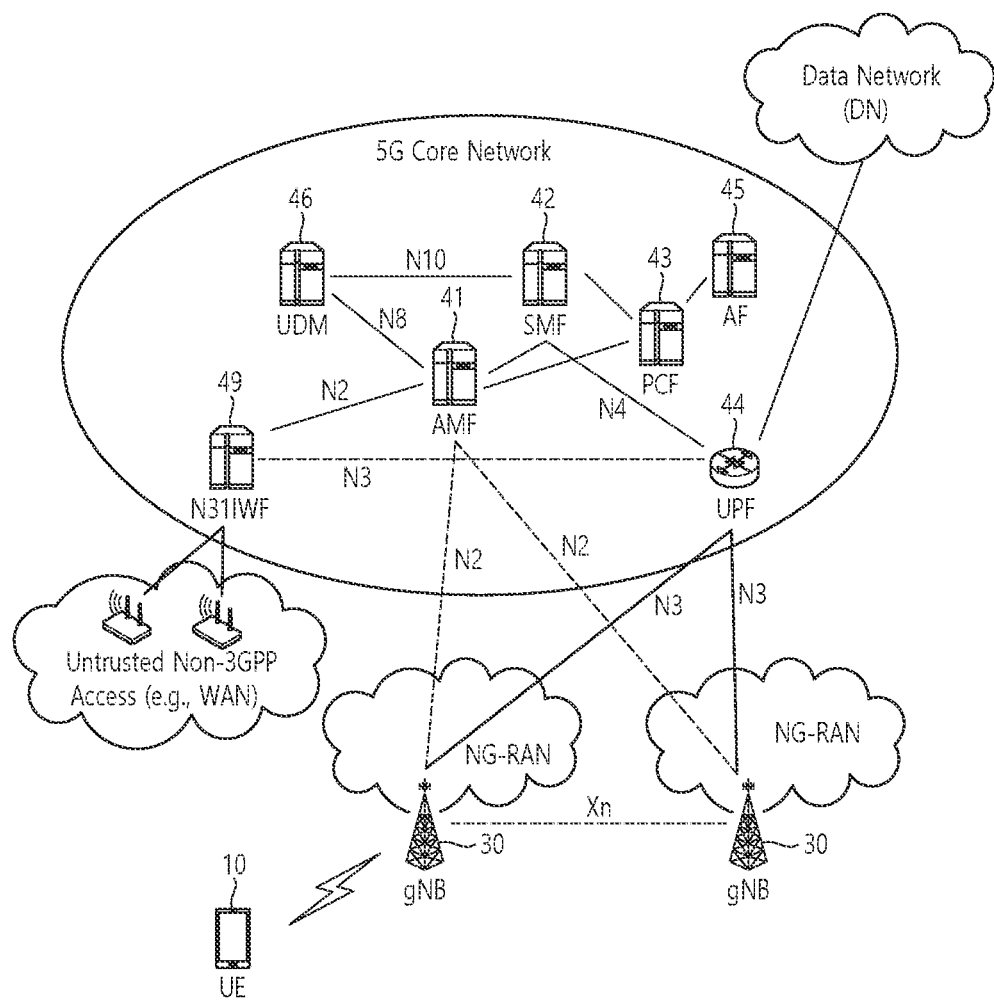
FIG. 1 is a structural diagram of a next-generation mobile communication network.
Figure 2:
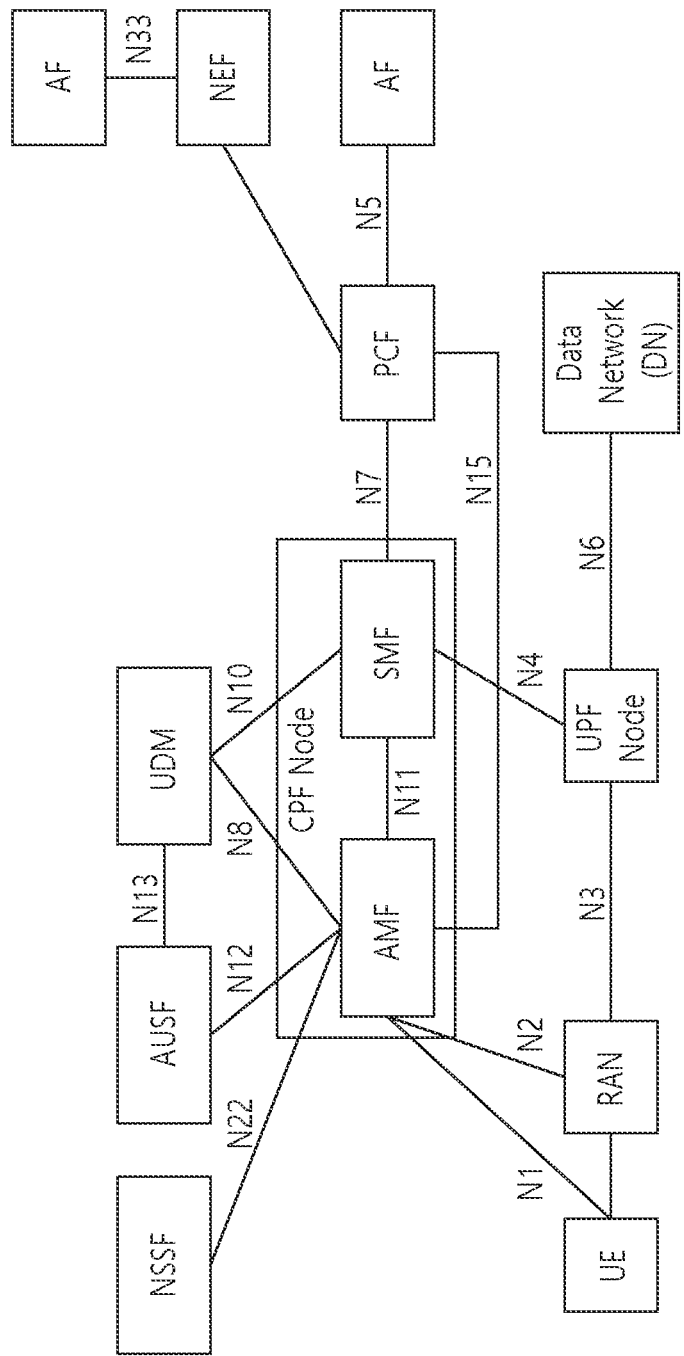
FIG. 2 is an exemplary diagram illustrating a predicted structure of a next generation mobile communication in terms of a node.
Figure 3:
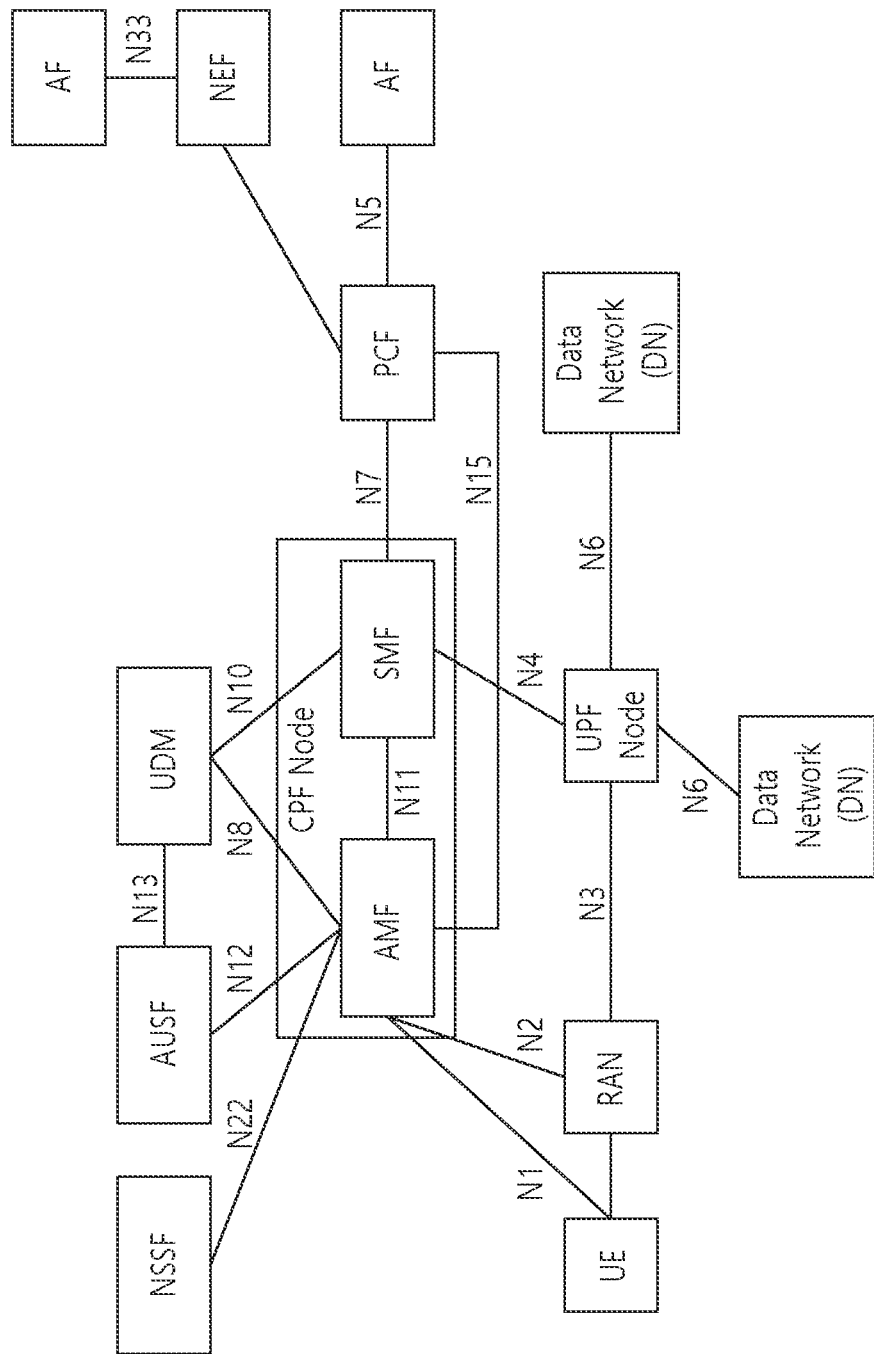
FIG. 3 is an exemplary diagram illustrating an architecture for supporting simultaneously access two data networks.
Figure 4:
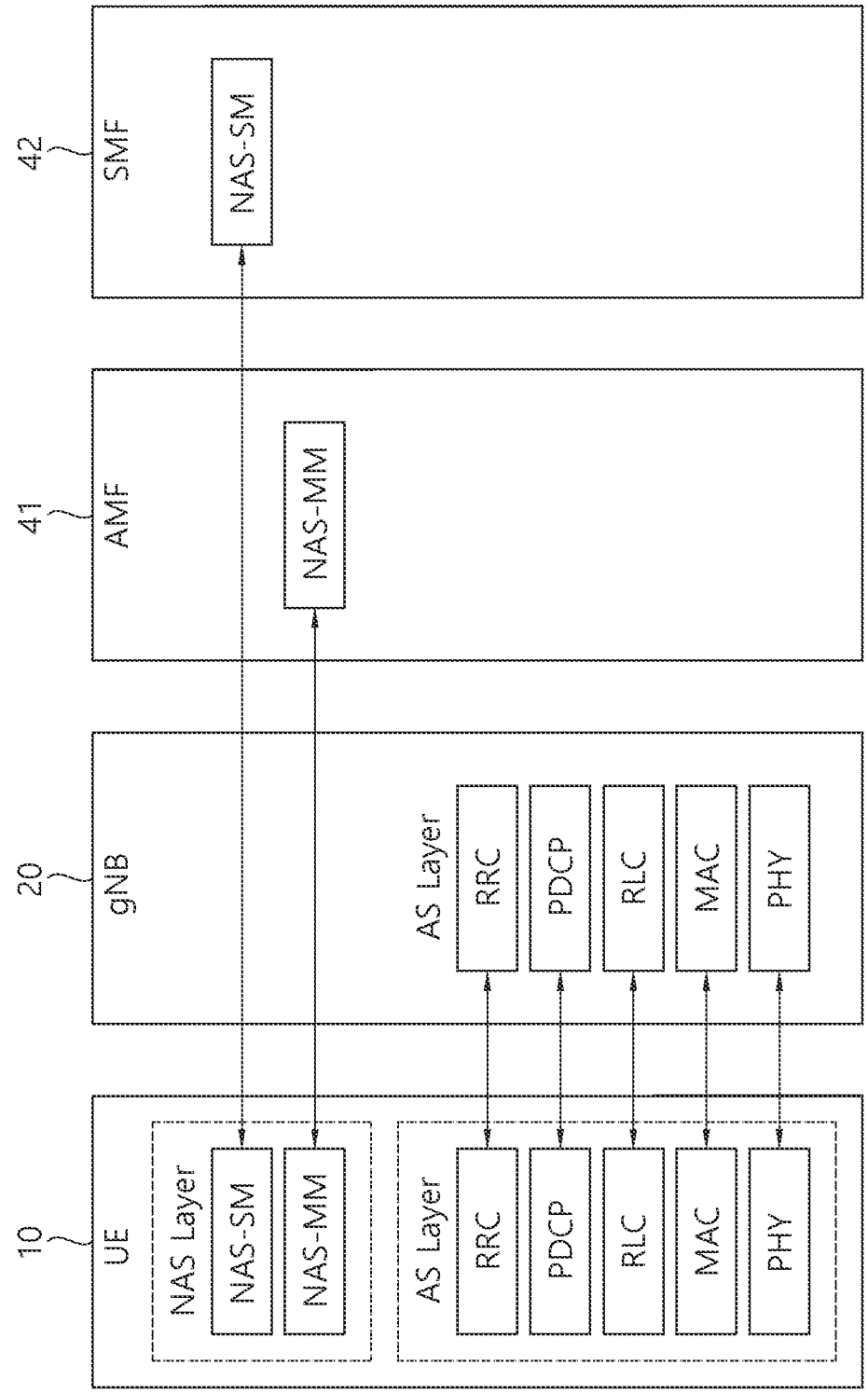
FIG. 4 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new Tracking Area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 5A:
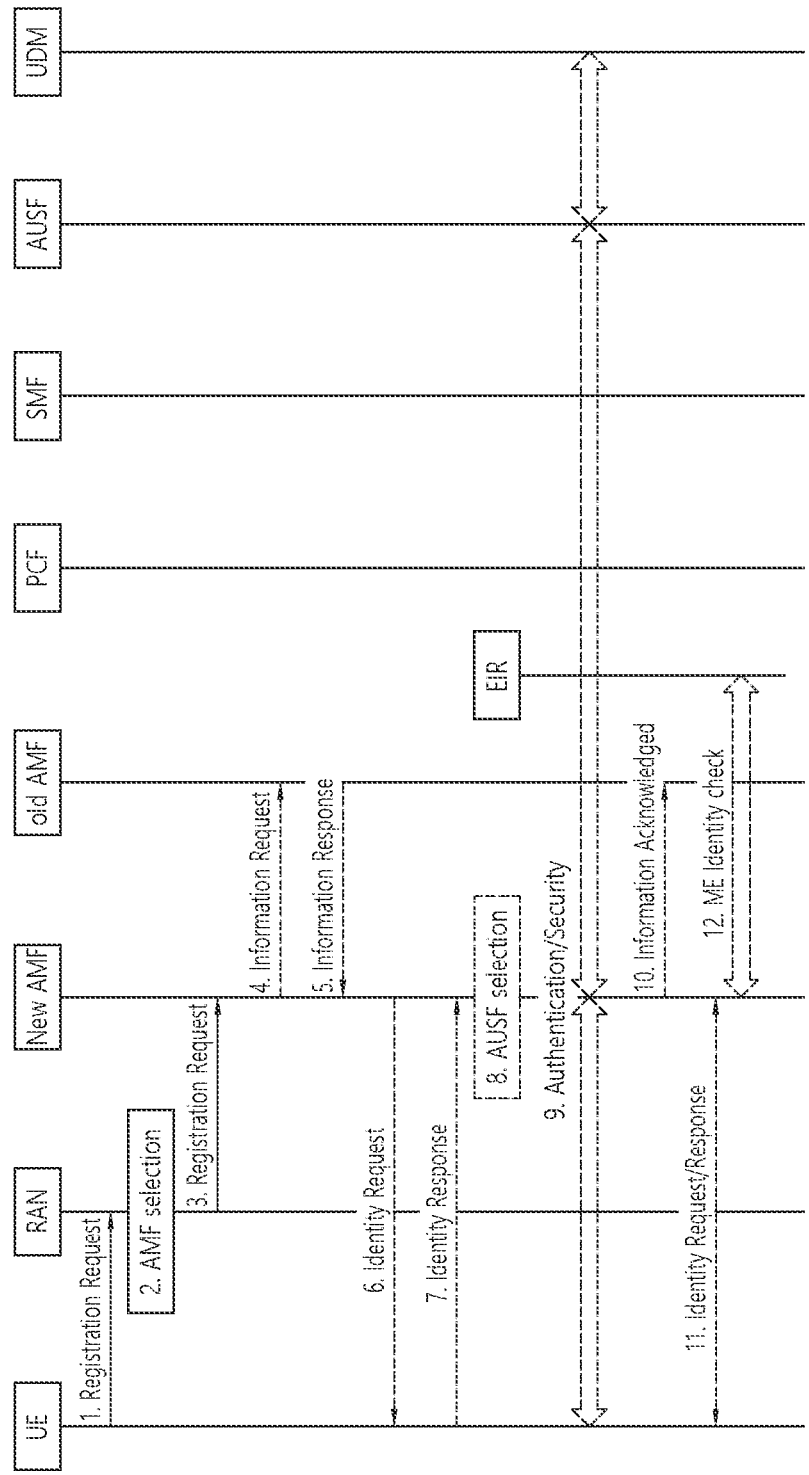
FIGS. 5a and 5b are a signal flowchart illustrating an exemplary registration procedure.
Figure 5B:
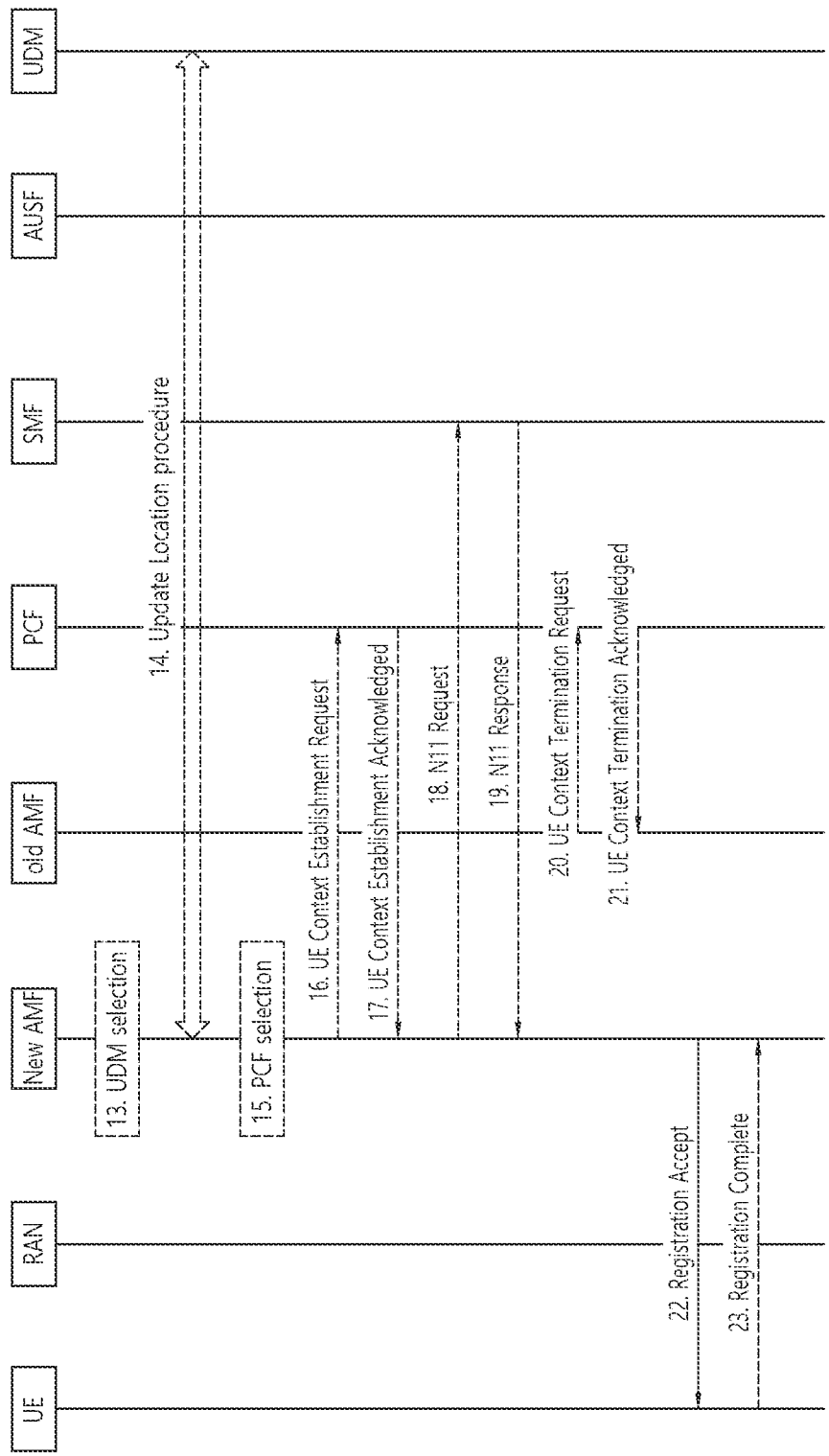

FIGS. 5*a* and 5*b* are a signal flowchart illustrating an exemplary registration procedure.

1) The UE may transmit an AN message to the RAN. The AN message may include an AN parameter and a registration request message. The registration request message may include information, such as a register type, a subscriber permanent ID or temporary user ID, a security parameter, Network Slice Selection Assistance Information (NSSAI), 5G capability of the UE, a Protocol Data Unit (PDU) session status, and so on.

In case of a 5G RAN, the AN parameter may include a Subscription Permanent Identifier (SUPI) or a temporary user ID, a selected network, and NSSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session
Establishment procedures may exist as described below.
A PDU Session Establishment procedure initiated by the UE.
A PDU Session Establishment procedure initiated by the network. For this, the network may transmit a Device Trigger message to an application (or applications) of the UE.

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for HPLMN.

More specifically, the UE may extract and store the allowed NSSAI and the information on the mapped NSSAI, included in the registration accept message received from the network (i.e., AMF) in the registration procedure shown in FIG. 5. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.
  CN Tunnel information: This corresponds to a core network address of an N3 tunnel corresponding to the PDU session.
  QoS Profile: This is used for providing mapping between a QoS parameter and a QoS Flow Identifier (QFI) to the RAN.
  PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.
  The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.
  The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<Roaming in Next-Generation Mobile Communication Networks>

Meanwhile, there are two methods for processing a signaling request from the UE in a situation in which the UE roams in a visited network, e.g., a Visited Public Land Mobile Network (VPLMN). The first scheme, a Local Break Out (LBO) scheme, processes a signaling request from a UE in a visited network. According to the second scheme, a Home Routing (HR) scheme, the visited network delivers a signaling request from the UE to the home network of the UE.

Figure 7A:
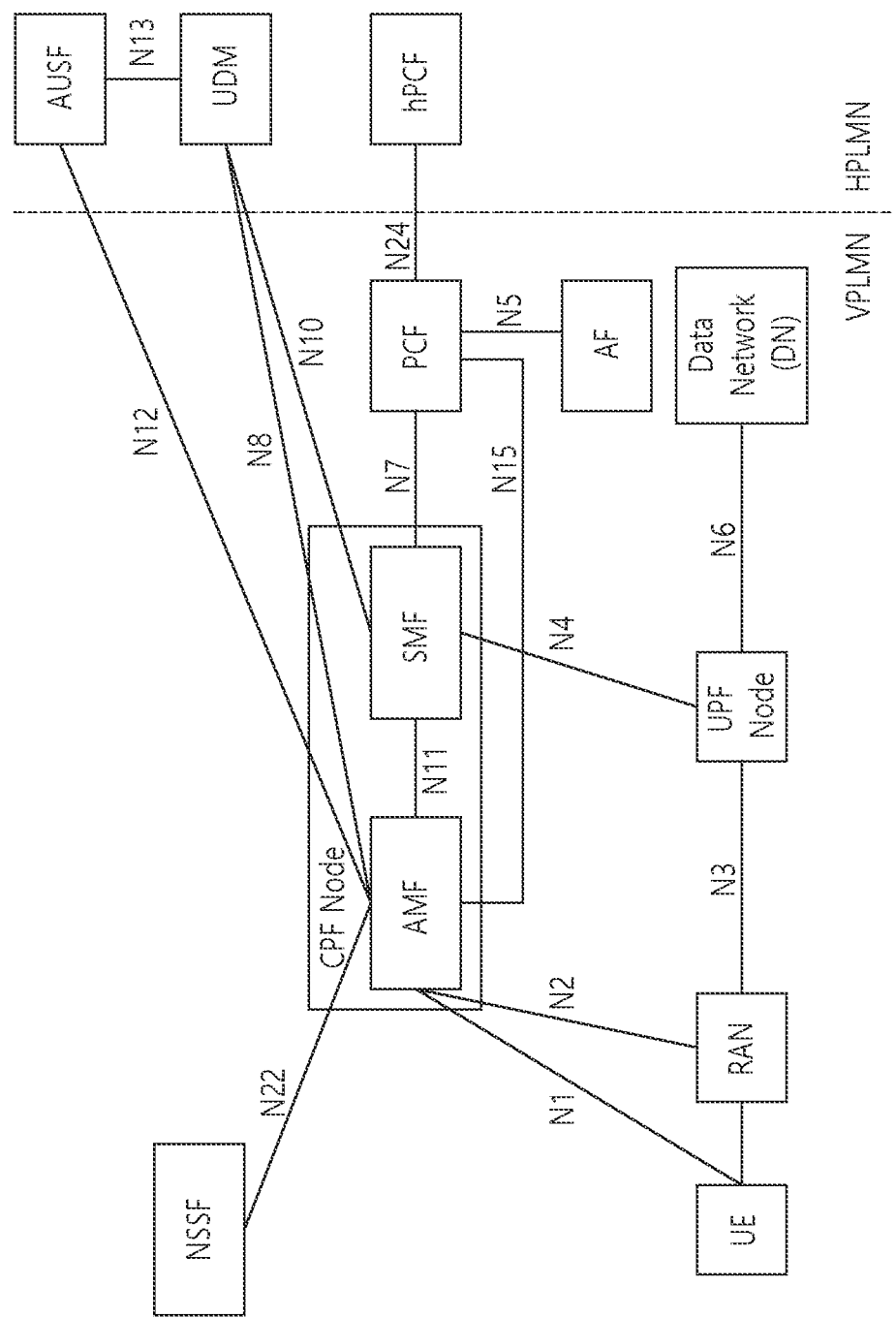
FIG. 7a is an exemplary diagram illustrating an architecture to which a Local Break Out (LBO) scheme is applied in roaming.
Figure 7B:
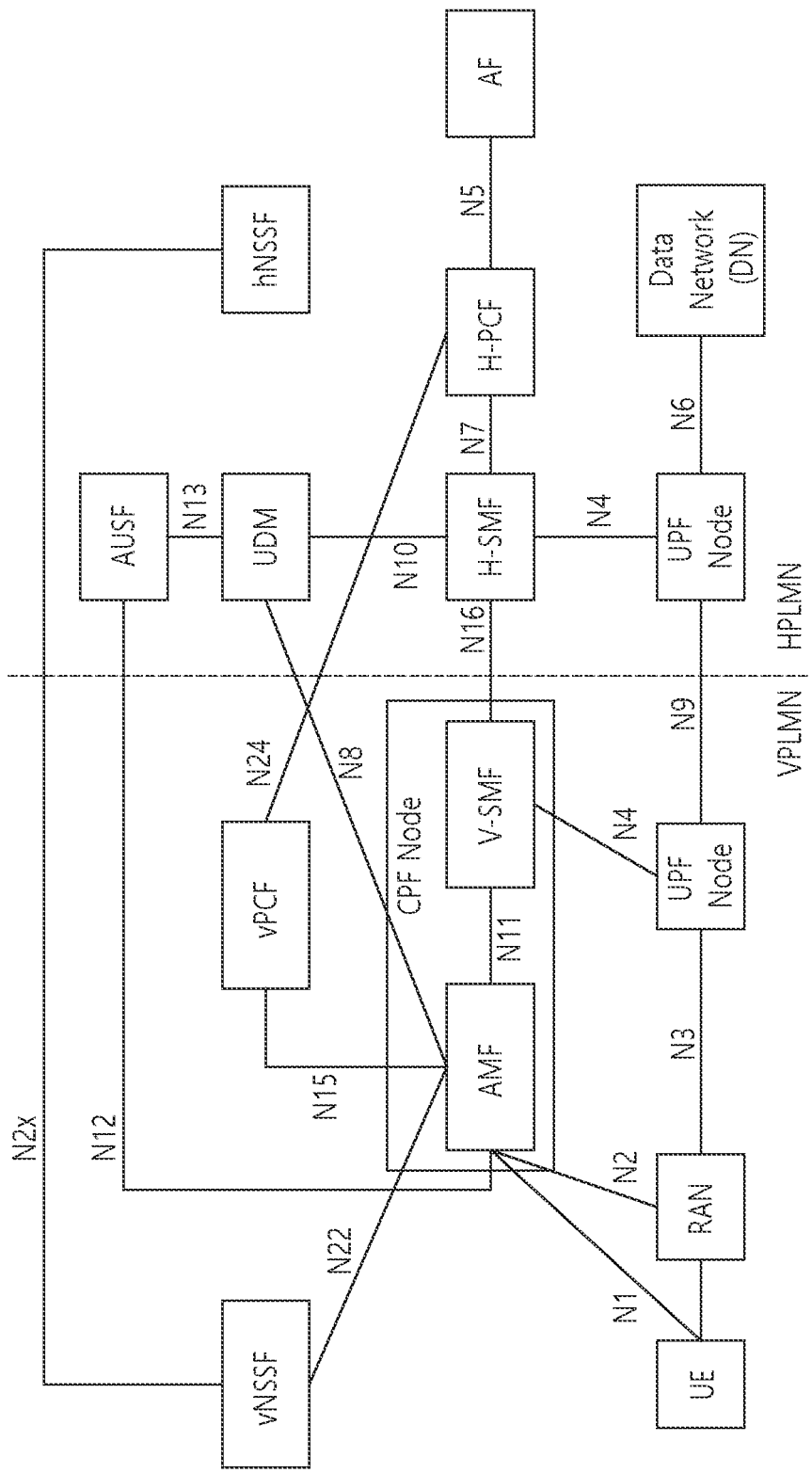
FIG. 7b is an exemplary diagram illustrating an architecture to which a Home Routed (HR) scheme is applied in roaming.
Figure 8B:
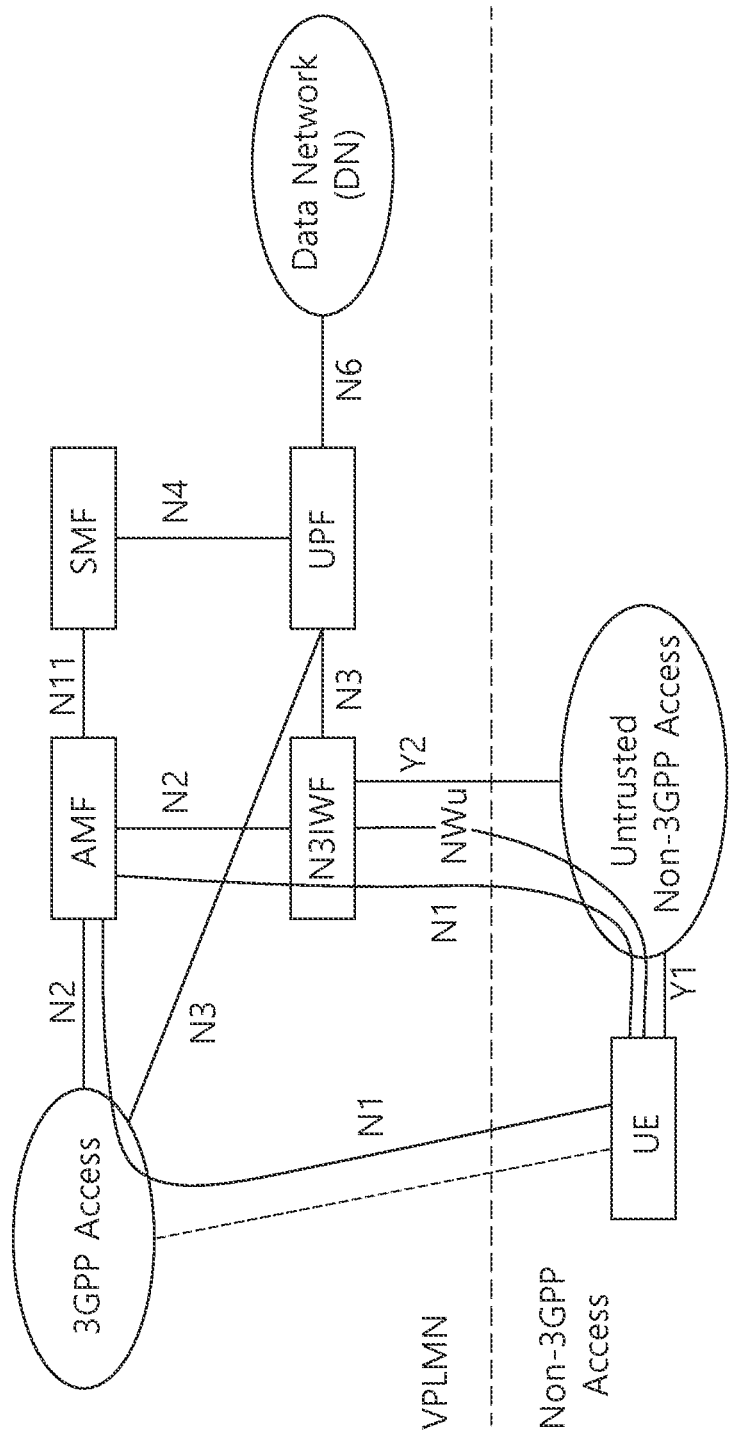
Figure 8C:
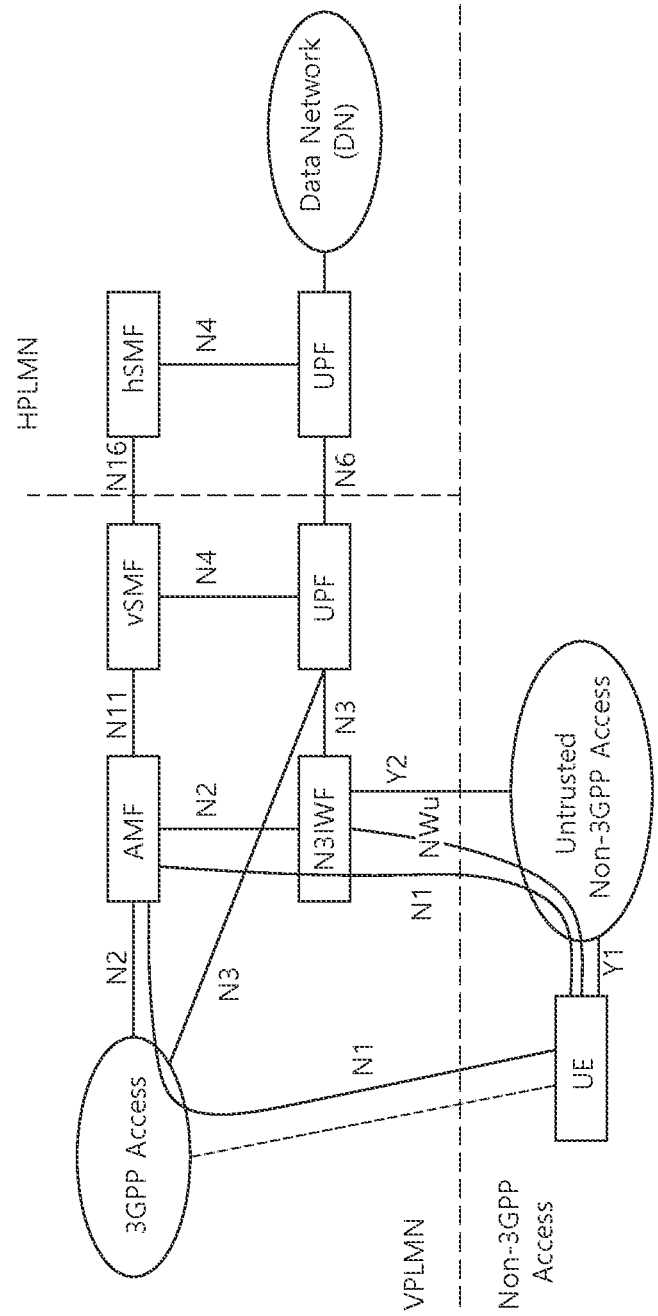
Figure 8D:
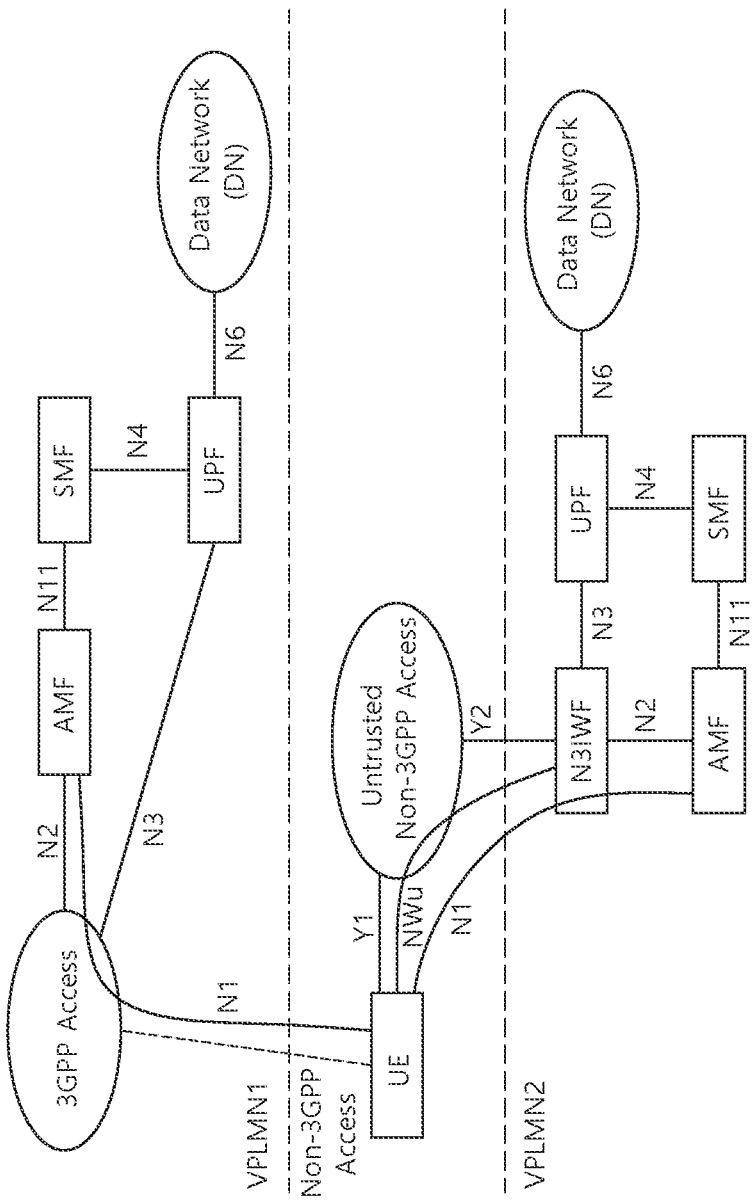
Figure 8E:
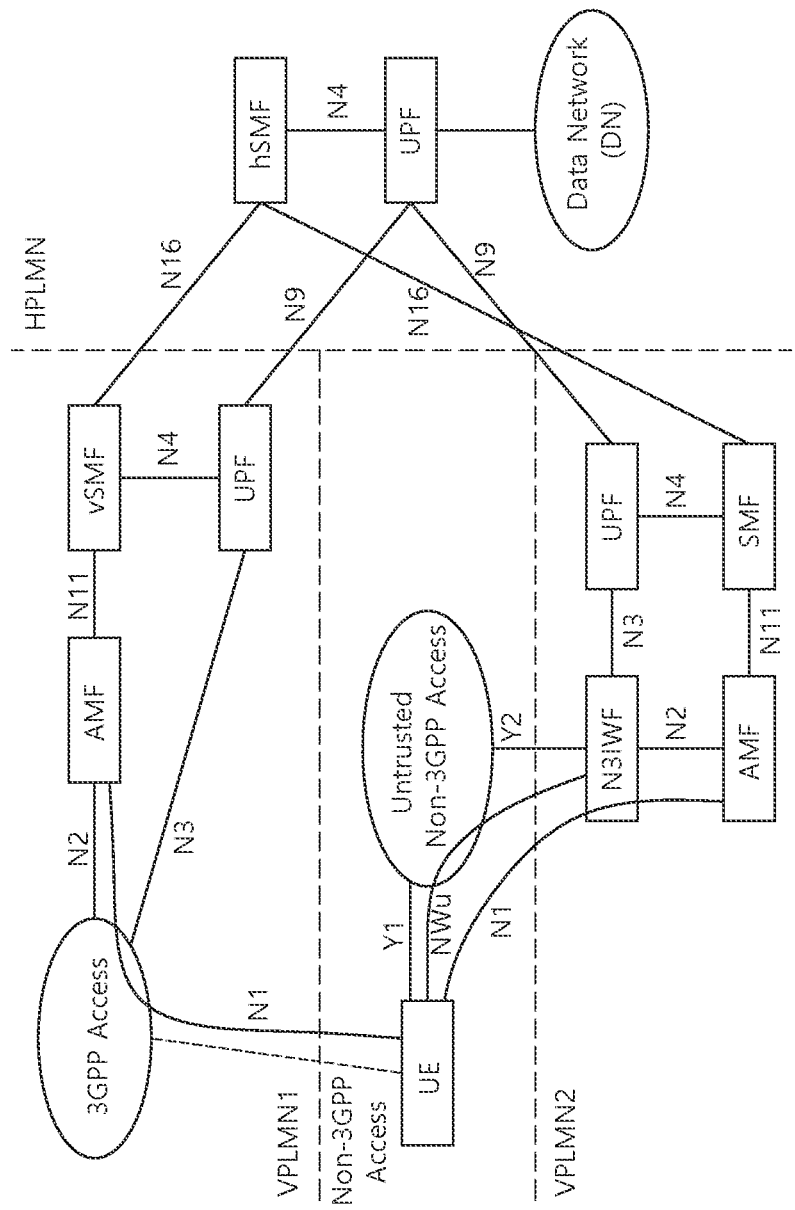
Figure 8F:
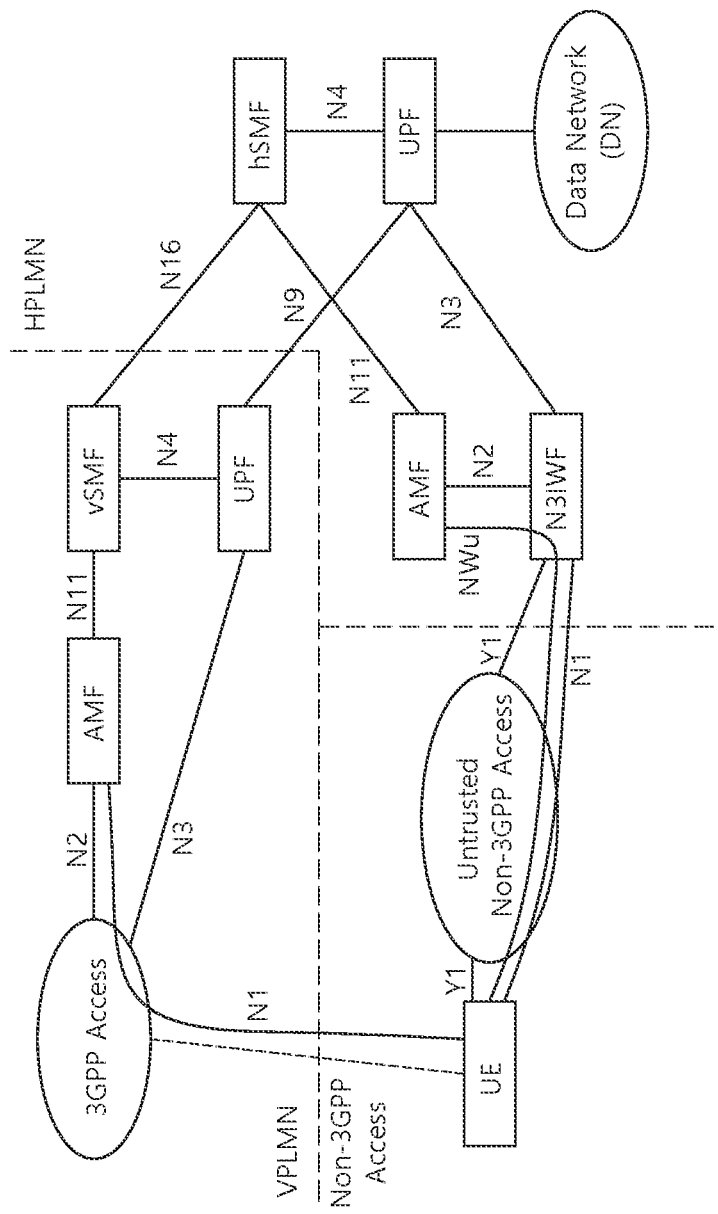

FIG. 7a is an exemplary diagram illustrating an architecture to which a Local Break Out (LBO) scheme is applied in roaming, and FIG. 7b is an exemplary diagram illustrating an architecture to which a Home Routed (HR) scheme is applied in roaming.

As shown in FIG. 7a, in the architecture to which the LBO scheme is applied, the user's data is delivered to the data network in the VPLMN. To this end, the PCF in the VPLMN performs an interaction with the AF in order to create a PCC rule for a service in the VPLMN. The PCF node in the VPLMN creates a PCC rule based on a policy set therein according to a roaming agreement with a Home Public Land Mobile Network (HPLMN) operator.

As shown in FIG. 7b, in the architecture to which the HR scheme is applied, data of the UE is delivered to the data network in the HPLMN.

<Data Routing to Non-3GPP Networks>

In next-generation mobile communication, data of the UE may be routed to a non-3GPP network, such as a Wireless Local Area Network (WLAN) or Wi-Fi.

FIG. 8a to FIG. 8f show architectures for routing data to non-3GPP access.

A Wireless Local Area Network (WLAN) or Wi-Fi is considered untrusted non-3GPP access. In order to connect the non-3GPP access to the core network, a Non-3GPP InterWorking Function (N3IWF) may be added.

<Session and Service Continuity>

The next-generation mobile communication network provides various modes to support Session and Service Continuity (SSC).

1) SSC Mode 1

In the PDU session establishment process, the UPF operating as a PDU session anchor is maintained regardless of the access technology (i.e., access type and cell). In the case of an IP-type PDU session, IP continuity is supported regardless of the movement of the UE. SSC mode 1 may be applied to any PDU session type and may also be applied to any access type.

2) SSC Mode 2

When a PDU session has one PDU session anchor, the network may trigger release of the PDU session and instruct the UE to establish the same PDU session. In the process of establishing the new PDU session, a UPF acting as a PDU session anchor may be newly selected. SSC mode 2 may be applied to any PDU session type and may also be applied to any access type.

3) SSC Mode 3

For a PDU session for SSC mode 3, the network may allow the UE to establish a connection using a new PDU session to the same data network before releasing the connection between the UE and the previous PDU session anchor. When the trigger condition is applied, the network may determine whether to select a PDU session anchor, i.e., UPF, suitable for the new condition of the UE. SSC mode 3 may be applied to any PDU session type and may also be applied to any access type.

4) Selection of SSC Mode

An SSC mode selection policy may be used to determine the type of SSC mode associated with the UE's application or UE's application group.

The operator may provide the SSC mode selection policy to the UE. The policy may include one or more SSC mode selection policy rules.

<Multi-Access (MA) PDU session>

In the prior art, the MA PDU session is a session that can be serviced simultaneously with 3GPP access and non-3GPP access using one PDU session.

Figure 9:
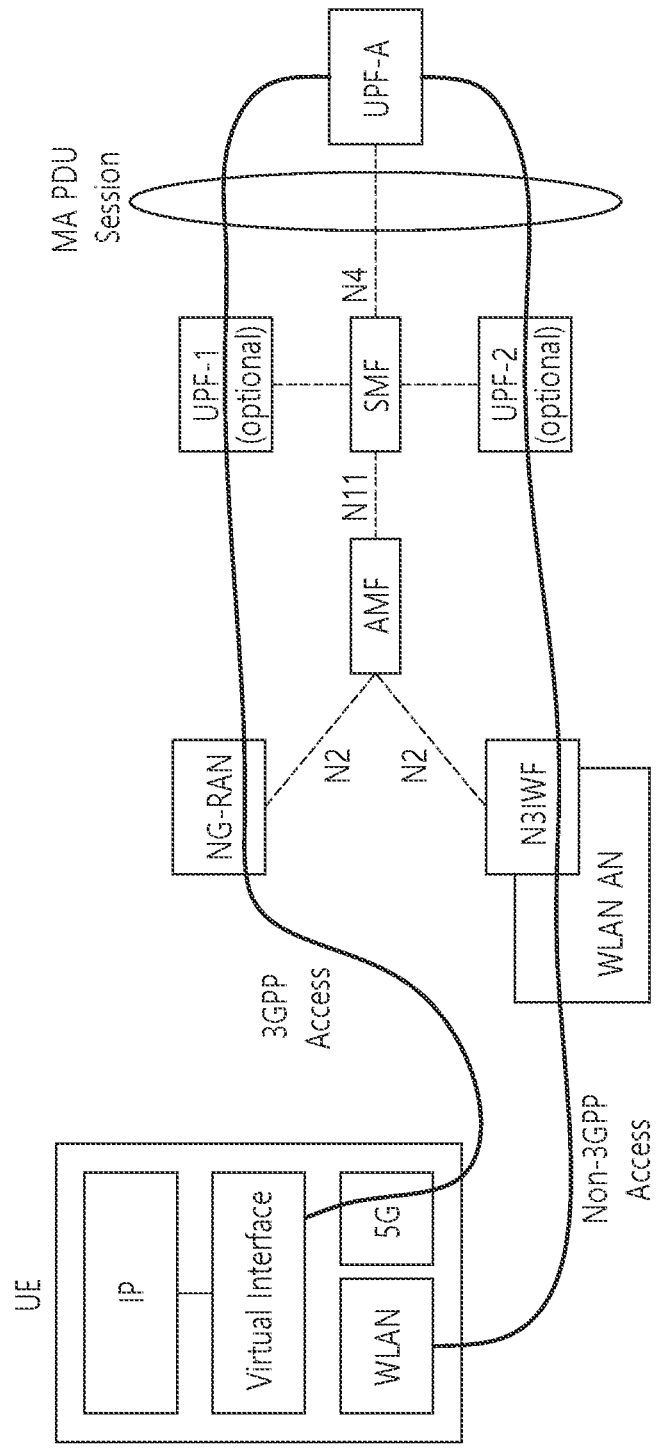
FIG. 9 shows an example in which a MA PDU session is generated.

FIG. 9 shows an example in which a MA PDU session is generated.

In FIG. 9, the MA PDU session is one PDU session and has a separate session tunnel for each access. One is established on 3GPP access, and the other PDU session is established on untrusted non-3GPP access (e.g., WLAN AN).

Since the MA PDU session is one session, the MA PDU session has the following characteristics.

(i) one DNN;
(ii) one UPF Anchor (UPF-A);
(iii) one PDU type (e.g., IPv6);
(iv) one session IP address
(v) one SSC mode
(vi) one HPLMN S-NSSAI.

The MA PDU session enables a multipath data link between the UE and UPF-A. This can be implemented below the IP layer.

A MA PDU session may be established through one of the following procedures.

(i) It can be established through two separate PDU session establishment procedures. This is called individual establishment.

(ii) It may be established through one MA PDU session establishment procedure. That is, the MA PDU session is simultaneously established in two accesses with one session establishment request. This is called binding establishment.

After the MA PDU session is established, Session Management (SM) signaling related to the MA PDU session may be transmitted and received through random access.

A. Individual Establishment of MA PDU Session

A MA PDU session may be established through two separate PDU session establishment procedures. For example, the UE may establish a MA PDU session on 3GPP access, and then perform a PDU session establishment procedure on non-3GPP access in order to add non-3GPP access to the MA PDU session created on 3GPP access. The request type in the establishment request message for adding the second access may be set to "MA PDU Request".

B. Binding Establishment.

A MA PDU session may be simultaneously established for 3GPP access and non-3GPP access through one procedure. Such one procedure may be referred to as a MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

Figure 10:
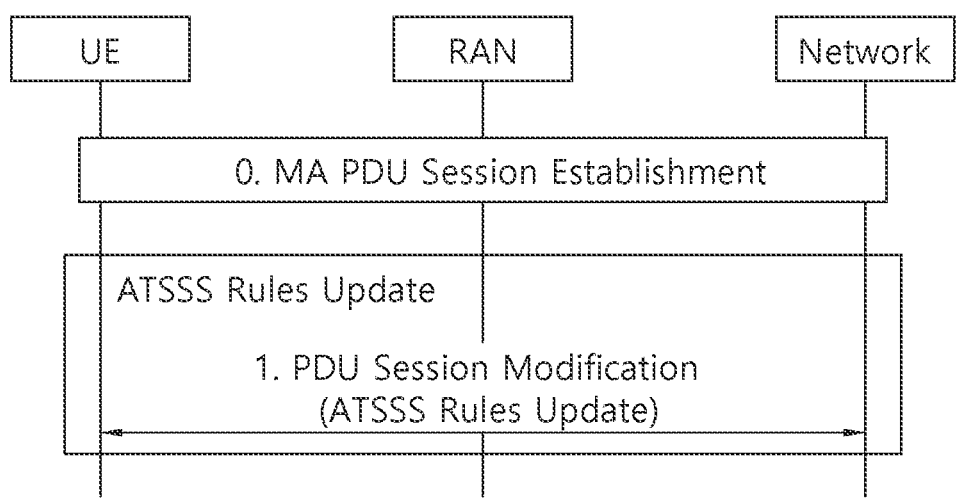
FIG. 10 shows an example of applying the ATSSS rules to the MA PDU session.

FIG. 10 shows an example of applying the ATSSS rules to the MA PDU session.

Referring to FIG. 10, if the SMF wants to move an IP flow transmitted to non-3GPP access to 3GPP access in a state in which a MA PDU session is established, updated ATSSS rules can be transmitted through 3GPP access.

Figure 11A:
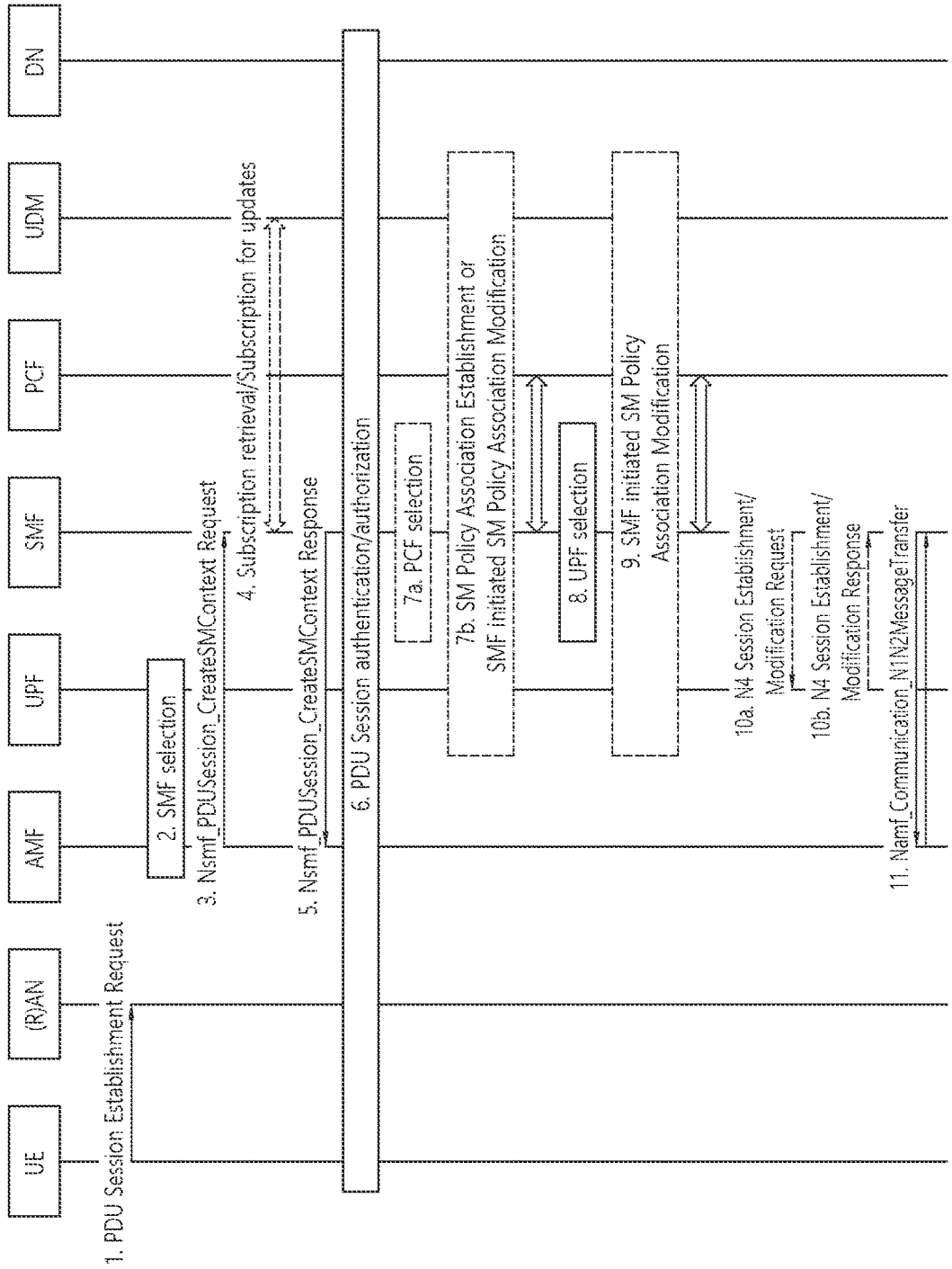
FIGS. 11a and 11b are signal flow diagrams illustrating a PDU session establishment procedure.
Figure 11B:
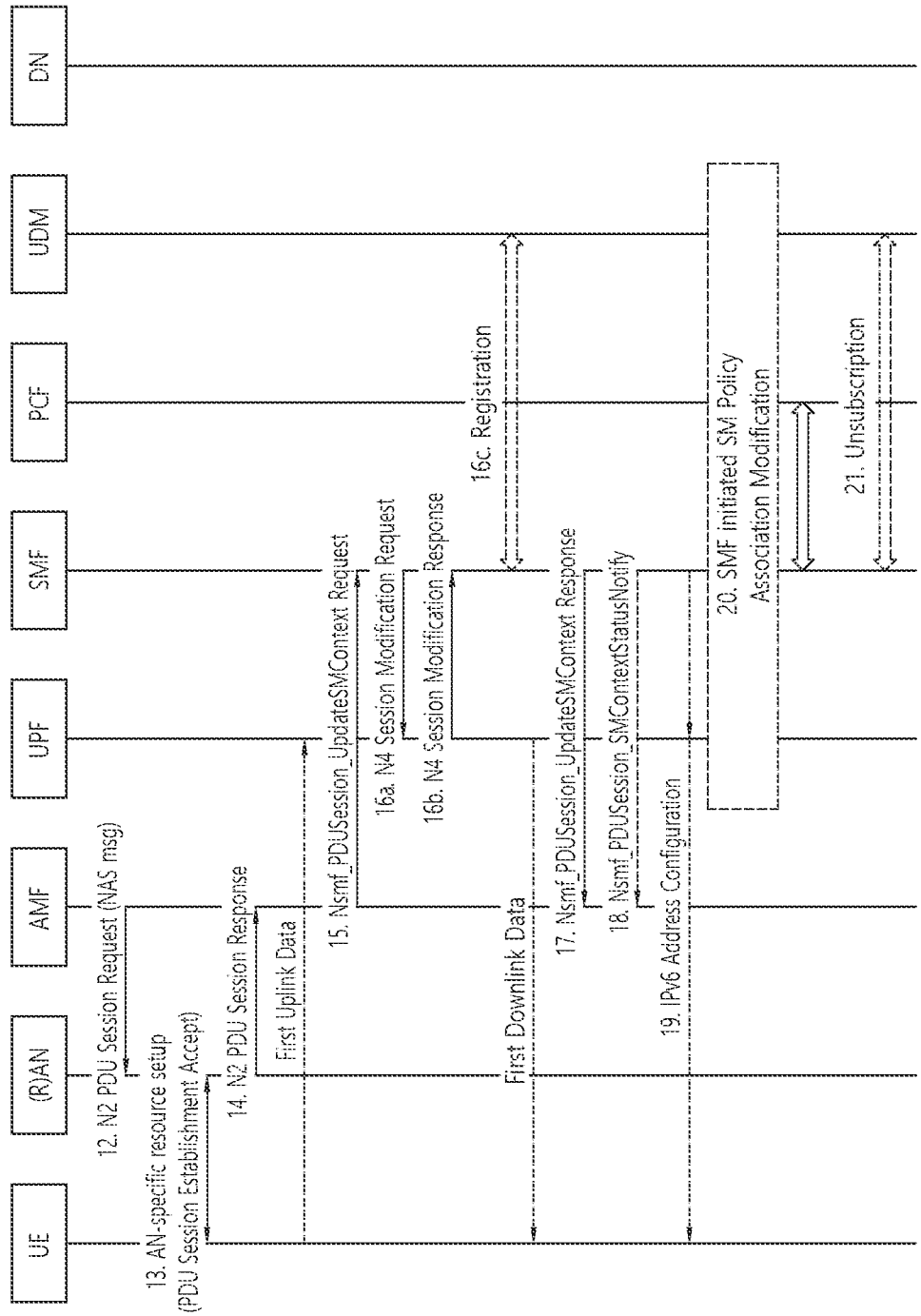

FIGS. 11a and 11b are signal flow diagrams illustrating a PDU session establishment procedure.

The PDU session establishment procedure shown in FIGS. 11a and 11b is similar to the PDU session establishment procedure shown in FIGS. 6a and 6b. Hereinafter, the differentiated parts will be mainly described.

1) The UE may initiate the UE-initiated PDU session establishment procedure by sending a NAS message including the PDU session establishment request message in the N1 SM information.

The PDU session establishment request message may include an indication indicating that it is a request for an MA PDU session.

3) Upon receiving the PDU session establishment request message, the SMF may know that the UE has requested the MA PDU session based on the indication.

11) When the MA PDU session establishment is allowed, a PDU session establishment accept message is transmitted.

Figure 12A:
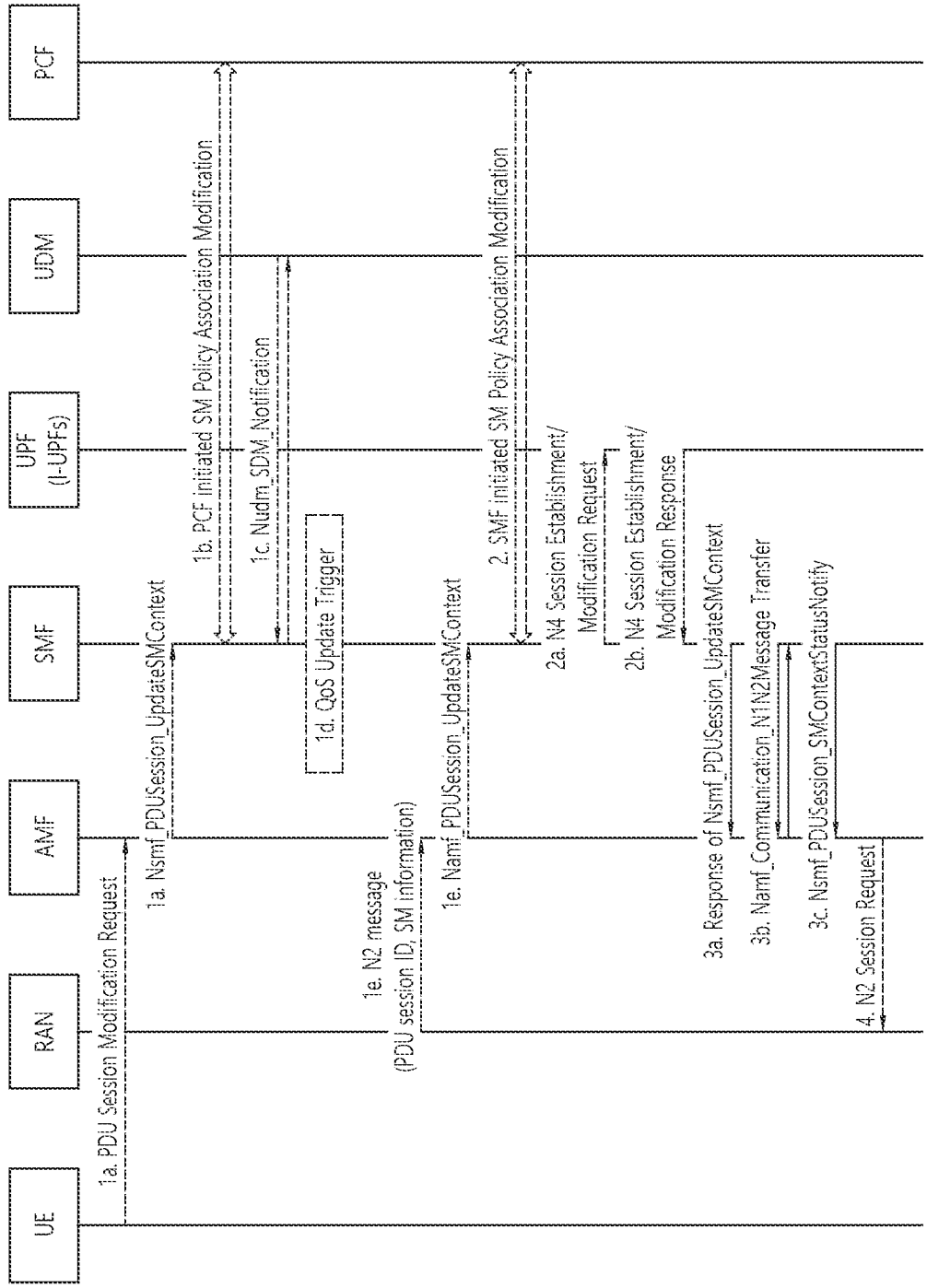
FIGS. 12a and 12b show a modification procedure for a PDU session.
Figure 12B:
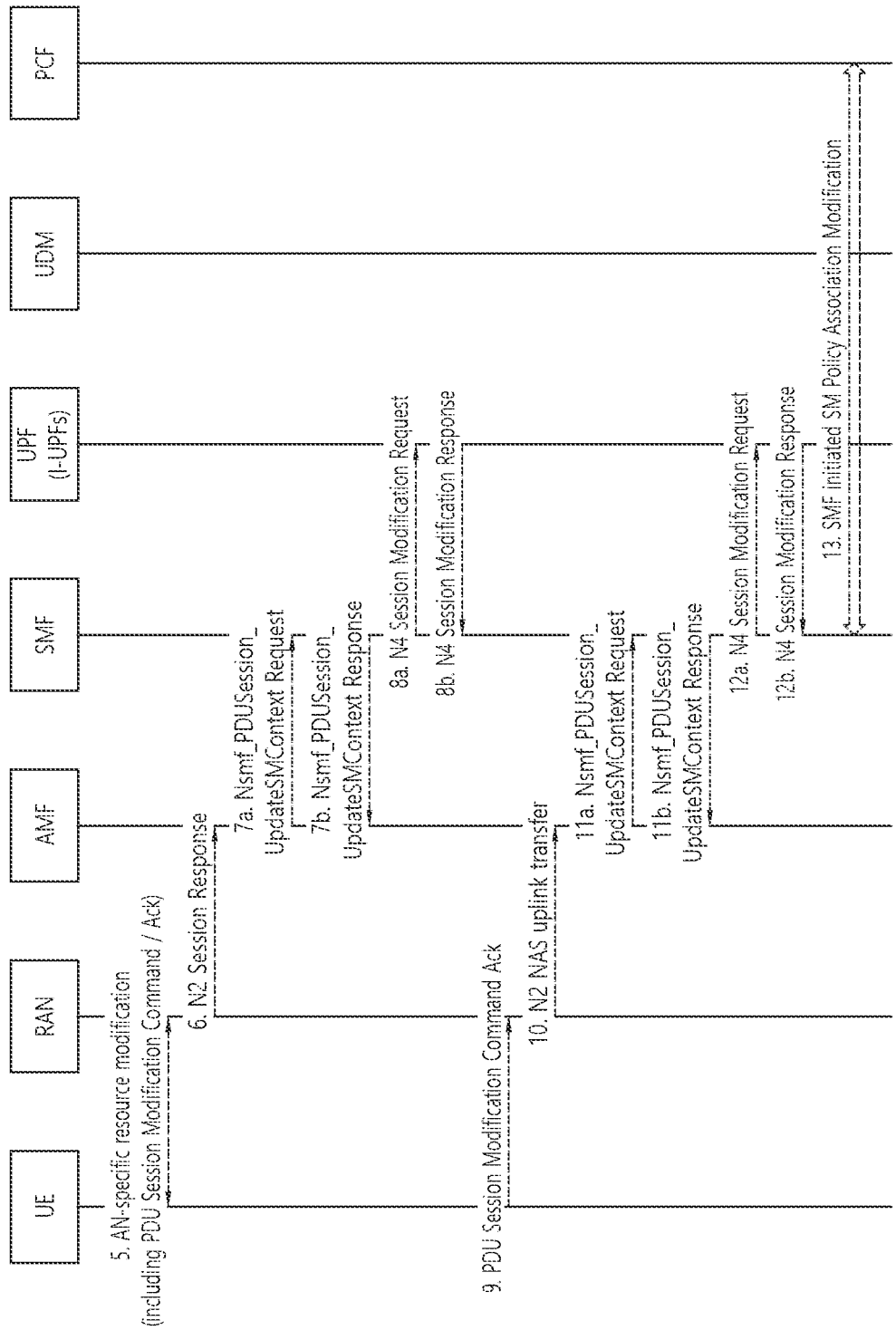

FIGS. 12a and 12b show a modification procedure for a PDU session.

The MA PDU session may be established/managed based on the PDU session modification procedure.

The PDU session modification procedure may be initiated by the UE or may be initiated by the network.

1a) When initiated by the UE, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, requested QoS information, SGSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a Session Management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) When initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include QFI, user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy association modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7, which will be described later, may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command. The PDU session modification command may include a PDU session ID, a QoS rule, a QuS rule operation, QoS flow level QoS parameters, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command. The PDU session modification command may include a PDU session ID, a QoS rule, and a QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters the reachable state, i.e., the CM-CONNECTED state, the AMF may transmit an N1 message to synchronize the UE context with the UE.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, in order to modify the necessary AN resources related to the PDU session, an RRC connection reconfiguration procedure may be performed with the UE.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command. The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy association modification procedure.

The SMF may notify the requesting entity for user location information related to the change of the PDU session.

In step 3 above, the SMF sends a PDU session modification command message, including the updated ATSSS rules and QoS rules, to non-3GPP access in order to move the QoS flow via 3GPP access and update the UE's ATSSS rules and QoS rules. An N2 request message for setting up a GBR QoS flow to the non-3GPP access is also transmitted.

According to the updated ATSSS rules and QoS rule in step S above, the UE may transmit uplink data through non-3GPP access.

In step 8 or step 12 above, the N4 rule of the UPF is updated. At this point, the steering rules can be updated to direct traffic to the non-3GPP access. Alternatively, by configuring an Active-Standby rule when creating a MA PDU session, the downlink data may be sent to the non-3GPP access from the moment it receives a report of an unavailable state from the UE.

Problems to be Solved by the Disclosure of the Present Specification

In order to support ATSSS, a function called Performance Measurement Function (PMF) may be defined. Both the UE and the UPF may include a PMF layer (or entity) to support the PMF. The UE and the UPF send and receive a PMF-Echo-Request message and a PMF-Echo-Response message through the PMF layer (or entity) so as to measure Round Trip Time (RTT). However, the PMF layer (or entity) has been discussed only conceptually, and concrete implementation methods have not been studied, so there are technical ambiguities as follows.

First issue: Whether the 5QI value used to transmit and receive the PMF-Echo-Request message and the PMF-Echo-Response message should be determined by Measurement Assistance Information (MAI) or whether it should be preset in the UE is technically unclear.

Second issue: It is technically unclear whether a PMF session should be established between the UE and the UPF before PMF-based messages are transmitted and received between the UE and the UPF.

The first issue is about which QoS flow to use when measuring RTT using the PMF-Echo-Request message and the PMF-Echo-Response message. In general, since RTT is affected by QoS, for example, when measuring PMF-based messages (e.g., PMF-Echo-Request message and PMF-Echo-Response message) using a QoS flow that is different from the QoS flow that transmits actual data, it may not perform the desired action. For example, even though actual data is being serviced with a low RTT through Guaranteed Bit Rate (GBR) QoS, when the PMF-Echo-Request message and the PMF-Echo-Response message are sent via the default QoS flow (e.g., QoS flow related to the default QoS rule), the RTT value may be measured very large. In this case, the UE may transmit data on another access based on the ATSSS rules. In this case, the RTT on the corresponding access may be worse than the RTT on the previous access (i.e., the RTT may be longer). Therefore, when performing performance measurement, the PMF-Echo-Request message and the PMF-Echo-Response message should be transmitted through the QoS flow in which the actual data is transmitted in order to perform an accurate operation. The problem is that QoS rules/N4 rules are needed to send the PMF-Echo-Request message and the PMF-Echo-Response message into a specific QoS Flow. However, since the address used in the PMF layer (or entity) is managed by the UPF, there is a problem that the PCF cannot provide QoS rules/N4 rules necessary for measurement because there is no information about the PMF.

The second issue is how the UE and the UPF exchange address information of the PMF. The PMF address information used in the UPF is included in the Measurement Assistance Information (MAI) in the PDU session establishment accept message and delivered during the process of creating the MA PDU session. However, since the UPF does not know the PMF address information used in the UE, there is a problem that only the UE can send the PMF message and the UPF cannot send the PMF message.

Disclosure of the Present Specification

Disclosures of the present specification propose methods for efficiently measuring flow information in an MA PDU session for traffic control in a 5G mobile communication system.

The disclosures described below in the present specification may be implemented in one or more combinations. Each of the drawings shows an embodiment of each disclosure, but the embodiments of the drawings may be implemented in combination with each other.

I. First Disclosure of the Present Specification: A Method of Providing Information on QoS Flow for Measurement in the MA PDU Session Establishment Process In the process of establishing the MA PDU session, the SMF may determine for which QoS flow the measurement is to be performed. The determination may be performed based on a PCC rule received from the PCF and/or a local configuration. The SMF informs QoS flow information for measurement to the UE and the UPF. In the case of informing the UE, it may be informed by being included in the Measurement Assistance Information (MAI) in the PDU session establishment accept message. In the case of informing the UPF, the related information may be informed while issuing the N4 rule. QoS flow information may be provided in the form of a list of QoS Flow Identifier (QFI) for measurement. In addition, the SMF may update QoS flow information for measurement through the PDU session modification procedure. For example, when QoS flows are added or removed through PDU session modification, the corresponding information may be updated. QoS flow information for measurement should include only information on successfully set up QoS flow. If a measurement report is performed only for a default QoS flow (i.e., a QoS flow related to a default QoS rule), the SMF may include only the QFI for the default QoS flow or may not provide information on the QoS flow at all. If the SMF does not provide any information on QoS flow at all, the UE may not perform measurement. However, even in this case, the UE may perform a report on access availability/unavailability indicating whether the corresponding access is available or not.

As another method, based on the ATSSS rules sent by the SMF, the UE may determine for which QoS flow measurement is required. For example, if there is a steering mode that requires measurement in the ATSSS rules (e.g., if there is an ATSSS rule using the smallest time delay), the UE may determine that measurements should be performed on QoS flows used in the corresponding ATSSS rule. For example, if the traffic transmitted by the ATSSS rule using the smallest delay uses two QoS flow #1 and QoS flow #2, the UE determines to measure QoS flow #1 and QoS flow #2. IF there is a steering mode that requires measurement by the Multi-Access Rule (MAR) in the N4 rule, the UPF may determine that measurements should be performed on QoS flows used in the corresponding MAR.

The MAI received by the UE may also include PMF address information of the UPF. Since the PMF address information of the UPF is managed by the UPF, the SMF should obtain the PMF address information of the UPF from the UPF during the PDU session establishment process. To this end, the SMF obtains MAI, i.e., the PMF address information of the UPF, from the UPF during the N4 session establishment process.

II. Second Disclosure of the Present Specification: A Method in which the UE/UPF Ignores the QoS Rule/N4 Rule for the PMF Message and Transmits it Through a Specific QoS Flow Unlike general data through the User Plane (UP), the UE and the UPF may process the PMF message separately. Therefore, the second disclosure of the present specification proposes a method in which the UE and the UPF send a PMF message through the QoS flow for which that the UE and the UPF want to measure without using the QoS rule/N4 rule.

For this, the UE, SMF, and UPF may operate as follows.

The various methods of the second disclosure described below may be implemented in one or more combinations. Each of the drawings shows an embodiment of each disclosure, but the embodiments of the drawings may be implemented in combination with each other.

II-1. First Method of the Second Disclosure: PMF Session Setup

After the MA PDU session is established, the UE sends a PMF Binding Request message to the PMF layer (or entity) of the UPF based on the PMF address information (e.g., IP address/port, MAC address/VLAN Identifier (VID)) of the UPF in the MAI. In this case, the UE allocates an address (e.g., port, VID) of the UE for the PMF layer (or entity). When the PMF layer (or entity) of the UPF receives the PMF Binding Request message from the UE, it stores the PMF address information of the UE, and then transmits a PMF message using the corresponding address when needed. The PMF layer (or entity) of the UPF sends a PMF Binding Response message to the UE to inform that the PMF session has been successfully established. This will be described later with reference to FIG. 13.

Figure 13:
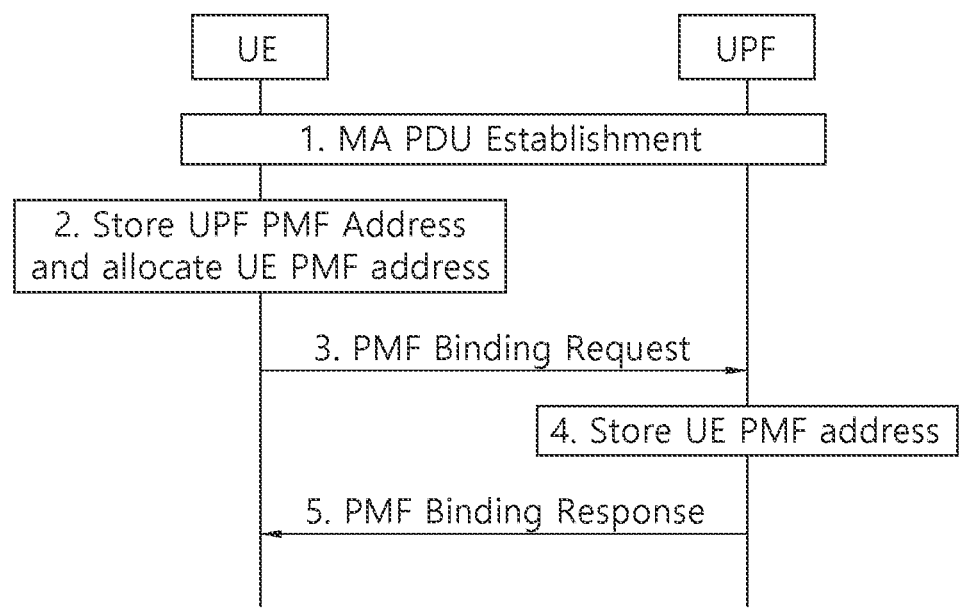
FIG. 13 is an exemplary diagram illustrating a procedure for binding a PMF session between a UE and a UPF according to the first method of the second disclosure.

FIG. 13 is an exemplary diagram illustrating a procedure for binding a PMF session between a UE and a UPF according to the first method of the second disclosure.

1) The UE receives a PDU session establishment accept message from the SMF while establishing the MA PDU session. The message may include MAI. The MAI may include PMF address information of the UPF.

2) The UE stores the PMF address information of the UPF in the MAI, and allocates the PMF address to the UE itself. For example, a specific UDP port number for a PMF session may be allocated.

3) The UE transmits a PMF Binding Request message using the PMF address assigned to itself and the PMF address of the UPF.

4) The PMF layer (or entity) of the UPF uses the address information in the PMF Binding Request message transmitted by the UE to find out the PMF address information of the UE and store it.

5) The PMF layer (or entity) of the UPF transmits a PMF Binding Response message using the PMF address of the UE to inform that the PMF session has been successfully established.

II-2. Second Method of the Second Disclosure: Measurement

Thereafter, when the UE and the UPF determine that measurement is necessary, the PMF echo procedure (i.e., transmission and reception of a PMF Echo Request message and a PMF Echo Response message) is performed to perform measurement. Basically, since the PMF message is transmitted through the user plane, the UE and the UPF should select a QoS flow to transmit the PMF messages by using a QoS rule and a Packet Detection Rule (PDR), respectively. However, UE and UPF ignore QoS rules/PDR for PMF messages, directly decide which QoS flow to transmit, and transmit through the corresponding QoS flow. Hereinafter, it will be described with reference to FIG. 14.

Figure 14:
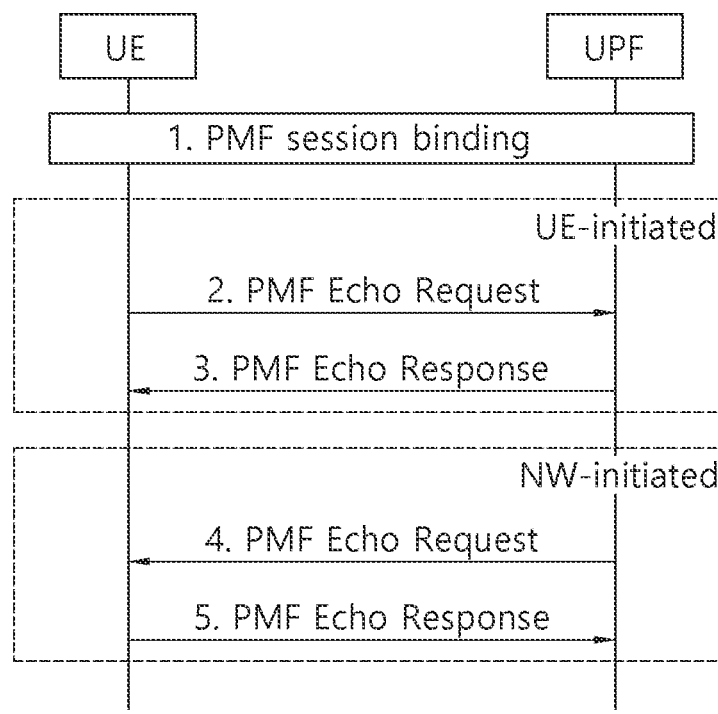
FIG. 14 is an exemplary diagram illustrating a procedure for performing measurement according to the second method of the second disclosure.

FIG. 14 is an exemplary diagram illustrating a procedure for performing measurement according to the second method of the second disclosure.

1) The UE and the UPF know the PMF address of the UE/PMF address information of the UPF through the PMF session binding.

2) When the UE transmits a PMF Echo Request message to the UPF using the PMF address of the UPF to measure a specific QoS flow, e.g., a QoS flow with QFI=1, the QoS rule possessed by the UE is ignored and the PMF Echo Request message is transmitted with QFI set to 1.

3) The UPF can determine which QoS flow the request is based on the QFI in the received PMF Echo Request message. When the UPF transmits the PMF Echo Response message to the UE using the PMF address of the UE, the UPF ignores the PDR and sets the same QFI for transmission.

4) When the UPF transmits a PMF Echo Request message to the UE using the PMF address of the UE to measure a specific QoS Flow, e.g., a QoS Flow with QFI=1, the PDR possessed by the UPF is ignored and the PMF Echo Request message is transmitted with QFI set to 1.

5) The UE may determine which QoS Flow the request is based on the QFI in the received PMF Echo Request message. The UE transmits the PMF Echo Response message to the PMF address of the UPF while ignoring the QoS rules and setting the same QFI for transmission.

III. Third Disclosure of the Present Specification: A Method in which SMF Generates and Provides a QoS Rule and/or N4 Rule Based on the PMF Information Received from the UE/UPF The third disclosure provides a method for the SMF directly generating and sending a QoS rule and/or an N4 rule to be used when the UE and the UPF transmit a PMF message. For this, the UE and the UPF should allocate different PMF addresses for each QoS flow that requires measurement. In addition, the QoS rule and/or the N4 rule can be created only when the allocated address information is notified to the SMF.

For this, the UE, SMF, and UPF may operate as follows.

III-1. First Method of the Third Disclosure: PMF Session Setup

The SMF determines which QoS flow needs to be measured in the process of establishing the MA PDU session, and requests the UPF to allocate a PMF address of the UPF for each QoS flow. The UPF allocates different addresses (e.g., IP address/port, MAC address/VLAN Identifier (VID)) for each QoS flow and delivers it to SMF. The SMF transmits the MAI including the PMF address information of the UPF to the UE. Along with this, the SMF creates a QoS rule and/or an N4 rule using the address information of the UPF and transmits it to the UE and the UPF. When the UE and UPF transmit the PMF Echo Request message and the PMF Echo Response message, the UE and the UPF acknowledge the PMF address of which UPF is associated with which QoS flow. Then, the UE and the UPF transmit a message by using the PMF address of the UPF associated with the QoS flow to be measured. At this time, since the SMF does not yet have information on the PMF address used by the UE, the PMF address of the UPF may be set as the destination address in the QoS rule transmitted to the UE, and the source address may be set to match all. Also, in the N4 rule that the SMF sends to the UPF, the PMF address of the UPF may be set as the source address and the destination address may be set to match all. In this way, the PMF message is transmitted through the corresponding QoS flow based on the QoS rule and/or the N4 rule. Hereinafter, it will be described with reference to the drawings.

Figure 15:
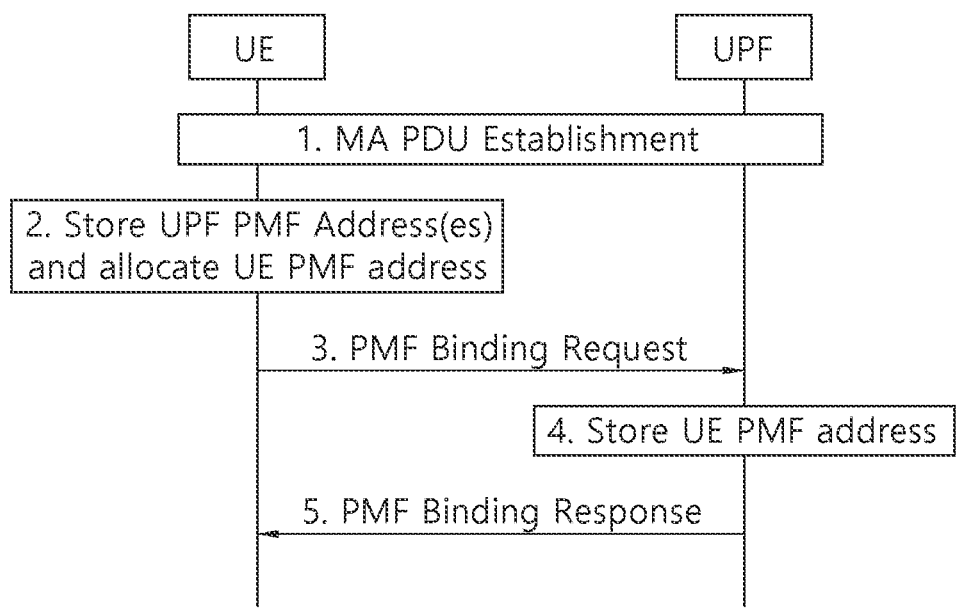
FIG. 15 is an exemplary diagram illustrating a procedure for binding a PMF session between a UE and a UPF according to the first method of the third disclosure.

FIG. 15 is an exemplary diagram illustrating a procedure for binding a PMF session between a UE and a UPF according to the first method of the third disclosure.

1) The SMF determines which QoS flow is required to be measured during the MA PDU session establishment process, and then requests PMF addresses of the UPF for the corresponding QoS flows from the UPF. The UPF allocates different PMF addresses (e.g., port, VID) to each QoS flow based on QoS flow information notified by the SMF that measurement is required. The UPF informs the corresponding information to the SMF. This process may be performed during the N4 session establishment process. The SMF informs the UE of the PMF address information for each QoS flow through MAI.

2) The UE stores the PMF address information of the UPF received from the SMF, and the UE allocates its own PMF address. For example, a specific UDP port number for a PMF session may be allocated. In this case, different addresses may be allocated to each QoS flow.

3) The UE transmits the PMF Binding Request message using the PMF address of the UE allocated to itself and the PMF address of the UPF. At this time, the UE transmits a PMF Binding Request message for all QoS flows. Alternatively, the UE may arbitrarily transmit a PMF Binding Request message for one QoS flow. If a separate address is allocated for each QoS flow, the UE should transmit a PMF Binding Request message for all QoS flows.

4) The PMF layer of UPF uses the address information in the PMF Binding Request message received from the UE to find out the PMF address information of the UE and stores it. If the UE transmits only one PMF Binding Request message, the UPF stores the same address information to use for all QoS flows.

5) The PMF layer of UPF sends a PMF Binding Response message to the UE using the PMF address of the UE to inform that the PMF session has been successfully established.

III-2. Second Method of the Third Disclosure: Measurement

Thereafter, when the UE and the UPF determine that measurement is necessary, the UE and the UPF perform measurement through the PMF Echo Request message and the PMF Echo Response message. At this time, when the UE and the UPF measure a specific QoS flow, the PMF address for the corresponding QoS flow should be used. In this way, the PMF message may be transmitted through the QoS flow for which measurement is required according to the QoS rule and/or PDR. Hereinafter, it will be described with reference to the drawings.

Figure 16:
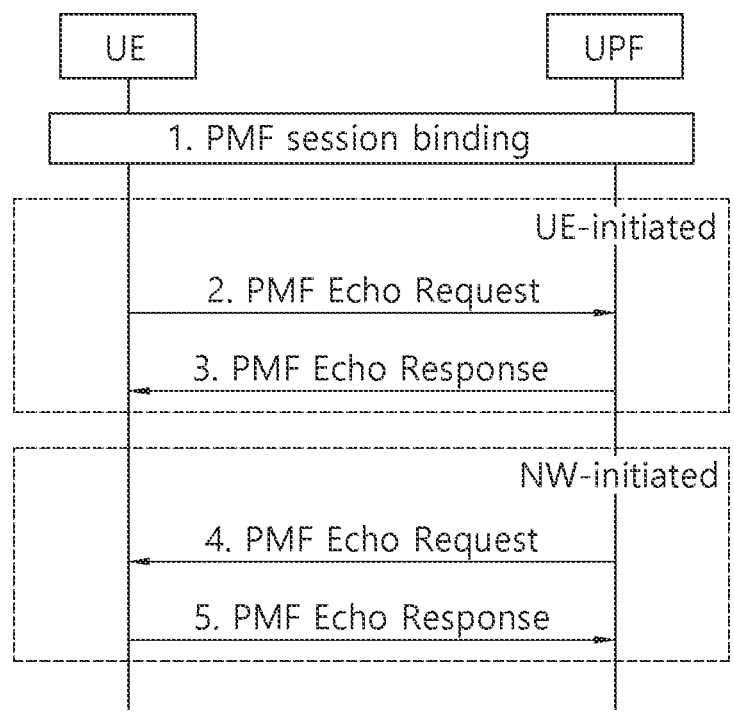
FIG. 16 is an exemplary diagram illustrating a procedure for performing measurement according to the second method of the third disclosure.

FIG. 16 is an exemplary diagram illustrating a procedure for performing measurement according to the second method of the third disclosure.

1) The UE and the UPF know the PMF address of the UE/the PMF address of the UPF for each QoS flow through the PMF session binding.

2) When the UE transmits a PMF Echo Request message to the UPF using the PMF address of the UPF to perform measurement on a specific QoS flow, e.g., a QoS flow with QFI=1, the UE transmits PMF Echo Request message using the PMF address of the UE/the PMF address of the UPF allocated for the corresponding QoS flow. In this way, the PMF Echo Request message is transmitted with QFI=1 according to the QoS rule of the UE.

3) The UPF may determine which QoS flow request is based on the QFI in the received PMF Echo Request message or the address information used in the PMF Echo Request message. Therefore, when the UPF transmits the PMF Echo Response message with the PMF address of the UE, it may be transmitted using the PMF address for the corresponding QoS flow. In this way, the PMF Echo Response message may be transmitted through the corresponding QoS flow according to the N4 rule.

4) In order to measure a specific QoS flow, e.g., a QoS flow with QFI=1, the UPF may transmit a PMF Echo Request message using the PMF address of the UE/PMF address of the UPF allocated for the corresponding QoS flow. In this way, the PMF Echo Request message may be transmitted with QFI=1 according to the N4 rule.

5) The UE may determine which QoS flow the request is based on the QFI in the received PMF Echo Request message or the address information used in the PMF Echo Request message. Accordingly, the UE may transmit the PMF Echo Response message using the PMF address for the corresponding QoS flow. In this way, the PMF Echo Response message is transmitted through the corresponding QoS flow according to the QoS rules.

IV. Fourth Disclosure of the Present Specification: A Method in which a Reflective QoS is Used The fourth disclosure is a method in which the UPF transmits a PMF message through QoS flow based on ignoring the N4 rule or based on the N4 rule provided by the SMF like Method 2 or Method 3, while the UE transmits a PMF message through QoS flow based on the derived QoS rule created through the reflective QoS.

According to the reflective QoS, the UE creates a QoS rule for the uplink based on information included in the downlink.

IV-1. First Method of the Fourth Disclosure: PMF Session Setup

After the MA PDU session is established, the UE transmits a PMF Binding Request message to the PMF layer of the UPF based on the PMF address information of the UPF in the MAI (e.g., IP address/port, MAC address/VLAN Identifier (VID)). This should be transmitted for each QoS flow that requires measurement. If the SMF provides the PMF address of the UPF for each QoS flow (e.g., when the method of the third disclosure is used in the UPF), the UE may allocate the same PMF address of the UE to all QoS flows. If the SMF allocates only one PMF address of the UPF (e.g., when the method of the second disclosure is used in the UPF), the UE allocates different PMF addresses of the UE for each QoS flow.

When the PMF layer of UPF receives a PMF Binding Request message from the UE, it stores the address information of the UE, and then transmits the PMF message using the corresponding address when needed. The PMF layer of UPF notifies the UE that the PMF session has been successfully established by sending the PMF Binding Response message. At this time, the UPF sets a Reflective QoS Indication (RQI) while sending a PMF Binding Response message so that the UE creates a derived QoS rule. Hereinafter, it will be described with reference to the drawings.

Figure 17:
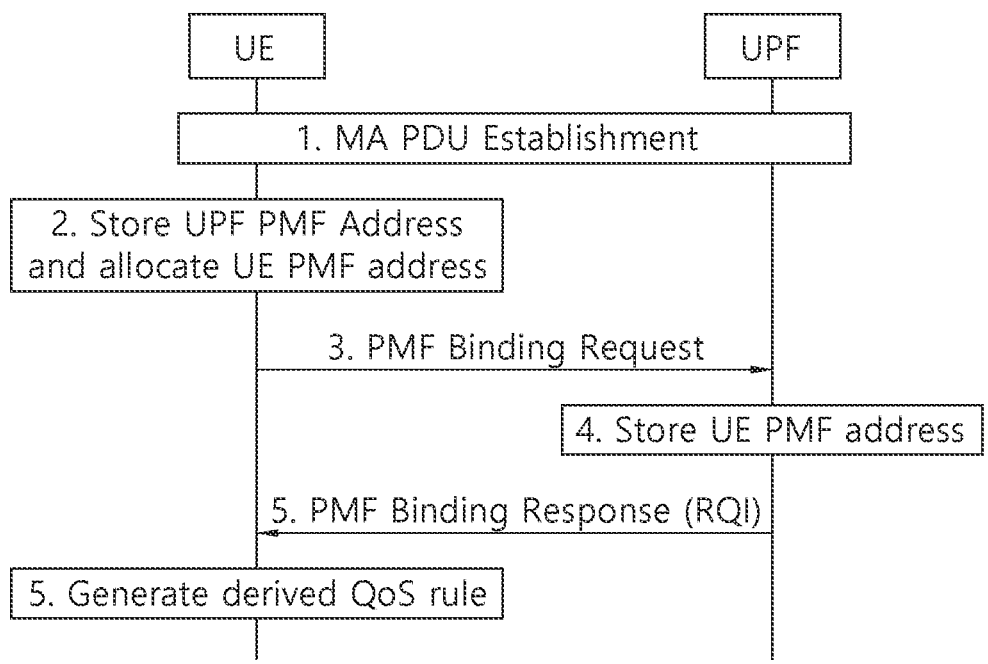
FIG. 17 is an exemplary diagram illustrating a procedure for binding a PMF session between a UE and a UPF according to the first method of the fourth disclosure.

FIG. 17 is an exemplary diagram illustrating a procedure for binding a PMF session between a UE and a UPF according to the first method of the fourth disclosure.

1) In the process of establishing the MA PDU session, the UE receives a PDU session establishment accept message from the SMF. The message includes MAI. The MAI has PMF address information of the UPF.

2) The UE stores the PMF address information of the UPF in the MAI, and allocates the PMF address of the UE. For example, a specific UDP port for a PMF session may be allocated. In this case, the UE may allocate different addresses for each QoS flow requiring measurement.

3) The UE transmits a PMF Binding Request message using the allocated PMF address of the UE and the PMF address of the UPF. This is performed for each QoS flow requiring measurement.

4) The PMF layer of the UPF uses the address information in the PMF Binding Request message received from the UE to find out the PMF address information of the UE and stores it.

5) The PMF layer of the UPF transmits a PMF Binding Response message to the PMF address of the UE to inform that the PMF session has been successfully established. In this case, the UPF sets and transmits a Reflective QoS Indication (RQI).

6) When the UE receives the PMF Binding Response message in which the RQI is set, the UE creates a derived QoS rule.

IV-2. Second Method of the Fourth Disclosure: Measurement

According to the second method of the fourth disclosure, when the UE and the UPF determine that measurement is necessary, the UE and the UPF perform the measurement by performing a PMF Echo procedure (i.e., transmission and reception of a PMF Echo Request message and a PMF Echo Response message). At this time, when the UE and the UPF measure a specific QoS flow, the PMF address for the corresponding QoS flow should be used. In this way, the PMF message may be transmitted through the QoS flow for which measurement is required according to the QoS rules (including the derived QoS rules). The UPF may perform transmission through the corresponding QoS flow according to the second or third disclosure. Hereinafter, it will be described with reference to the drawings.

Figure 18:
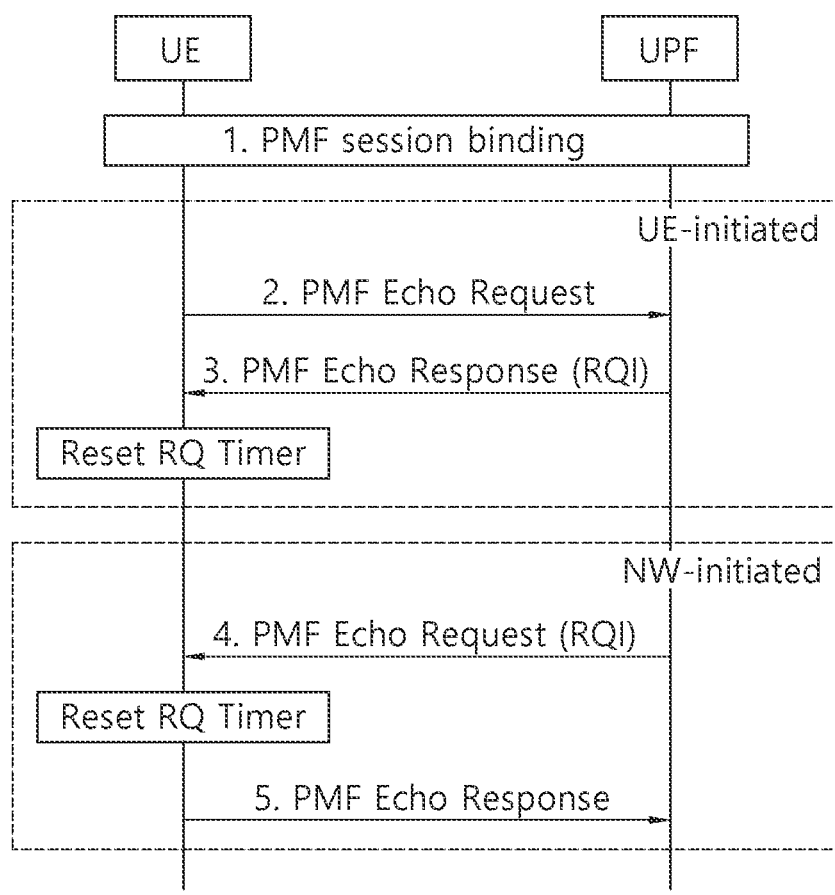
FIG. 18 is an exemplary diagram illustrating a procedure for performing measurement according to the second method of the fourth disclosure.

FIG. 18 is an exemplary diagram illustrating a procedure for performing measurement according to the second method of the fourth disclosure.

1) The UE and the UPF know the PMF address of the UE/PMF address of the UPF for each QoS flow through the PMF session binding.

2) When the UE intends to transmit a PMF Echo Request message using the PMF address of the UPF in order to measure a specific QoS flow, e.g., a QoS flow with QFI=1, the UE transmits the PMF Echo Request message using PMF address of the UE/PMF address of the UPF allocated for the corresponding QoS flow. In this way, the PMF Echo Request message is transmitted with QFI=1 according to the QoS rule of the UE.

3) The UPF may know which QoS flow is requested based on the QFI in the received PMF Echo Request message or the address information used in the PMF Echo Request message. In addition, when the UPF attempts to transmit the PMF Echo Response message using the PMF address of the UE, transmission may be performed using the PMF address for the corresponding QoS flow. In this way, the PMF Echo Response message may be transmitted through the corresponding QoS flow according to the N4 rule (the third disclosure) or may be transmitted through the corresponding QoS flow by ignoring the N4 rule (the second disclosure). At this time, the UPF sends the PMF Echo Response message by always setting the RQI. The UE resets the RQ Timer of the derived QoS rule matching the RQI set packet.

4) In order to measure a specific QoS flow, e.g., a QoS flow with QFI=1, the UPF transmits a PMF Echo Request using the PMF address of the UE/the PMF address of the UPF allocated for the corresponding QoS flow. In this way, the PMF Echo Request message is transmitted with QFI=1 according to the N4 rule (the third disclosure), or transmitted through the corresponding QoS flow by ignoring the N4 rule (the second disclosure). At this time, the UPF always sets the RQI while sending the PMF Echo Request message. The UE resets the RQ Timer of the derived QoS rule matching the RQI set packet.

5) The UE may determine which QoS flow the request is based on the QFI in the received PMF Echo Request message or the address information used in the PMF Echo Request message. Therefore, when the UE transmits the PMF Echo Response message, the UE may perform transmission using the PMF address for the corresponding QoS flow. In this way, the PMF Echo Response message is transmitted through the corresponding QoS flow according to the QoS rules.

6) The UE transmits the PMF Echo Request message before the RQ Timer expires and the rule is deleted while managing the derived QoS rule used for PMF message transmission. In this way, since the UPF sets the RQI while transmitting the Response message, the UE resets the RQ Timer again.

V. Fifth Disclosure of the Present Specification: Enhancement of Standard Specifications The fifth disclosure of the present specification will describe an enhancement method of the standard specification based on the contents of the first to fourth disclosures described above.

V-1. First Method of the Fifth Disclosure

V-1-1. Necessity of Per QoS Flow Measurement

The default QoS flow is best effort service and QoS may change according to radio condition or traffic load. Currently, "Smallest Delay" is the only steering mode which requires performance (i.e., RTT) measurement. Considering that "Smallest Delay" selects an access network which provides smaller delay, if the performance measurement is not stable, the UE and UPF may change the access network frequently.

In addition, RTT measurement over a default QoS flow may not meaningful if actual traffic is sent over the other QoS flow. For example, assume that an IP flow is sent via 3GPP access over a specific QoS Flow=X, which provides higher priority compared to default QoS flow and traffic over the QoS flow satisfies application requirement. If RTT is measured over a default QoS flow, the measured RTT value may be higher than RTT of non-3GPP access due to heavy traffic in 3GPP access. Then the UE and UPF will steer the traffic via non-3GPP access and the RTT may increase. So it is reasonable to perform the measurement of the QoS flow which the actual traffic is sent over. Therefore, it is proposed as follows.

Proposal 1: The ATSSS shall support performance measurement over a specific QoS flow.

V-1-2. PMF Address for Access Differentiation

The SMF may provide PMF address of the UPF when a MA PDU session is established. However, it is not clear whether the SMF provides one address, which is used for both accesses (i.e., 3GPP access and non-3GPP access), or two addresses, one for 3GPP access and the other one for non-3GPP access. This issue is associated with how the PMF layer of the UPF can recognize the associated access when it received the PMF message. This problem can be solved by the following options.

Option 1) allocating different PMF address for each access; or

Option 2) utilizing GTP tunneling address for each access; or

Option 3) adding access type information in the PMF message.

Option 1 has two possibilities, i.e., Option 1-1 uses different address in the UE, and Option 1-2 uses different address in the UPF.

The same problem is also exist in the UE. The UE need to know the associated access when it received PMF message. It can be solved by using the similar mechanism with UPF case. The difference is that the UE does not have GTP so instead of it, the UE should use access type information.

Considering that PMF (both in the UE and UPF) is implemented on top of the user plane, the PMF itself does not know whether a data is received via which access or which GTP tunnel. In order to get such information, the PMF need to interact with lower layer, i.e., ask to the lower layer or lower layer always need to provide information. However, such interaction between upper and lower layer is complex and should be avoided for simple implementation. In order to support Option 1, the UE and UPF need to store more address information while Option 3 can be implemented without any additional information. For access unavailability report, the PMF message need to include access information because the message can be sent over any available access. So, Option 3 may be preferred. Therefore, it is proposed as follows.

Proposal 2: Access information is included to each PMF message.

V-1-3. Notifying UE PMF Address

The PMF address of the UPF can be sent to the UE during the MA PDU session establishment. However, how the PMF address of the UE is notified to the UPF is not defined. The PMF address of the UE may be delivered via a NAS signalling during the MA PDU session establishment or may be delivered with sending user plane signaling after the MA PDU session is established.

In order to use NAS signaling, the UE need to always send PMF address of the UE to the SMF even though PMF may not be used. When MPTCP is used, the PMF is not required. The SMF may send the received PMF address information of the UE to the UPF. The user plane signaling may directly be sent to the UPF and it can be sent only when the SMF provided Measurement Assistance Information (MAI). One drawback of user plane signaling is that the UPF cannot initiate the downlink measurement until the UE sends the PMF address information of the UE. This can be solved by mandating the UE to send the PMF information of the UE as soon as MA PDU session is established. The PMF address information of the UE can be sent implicitly, i.e., by sending PMF message using the PMF address of the UE. Therefore, it is proposed as follows.

Proposal 3: The UE sends PMF address information of the UE as soon as MA PDU session is established via user plane.

V-1-4. Per QoS Flow Measurement

One of issue of performing per QoS flow measurement is how the UE can send the PMF message over a specific QoS flow. Basically, PMF messages are sent via user plane so the UE shall use QoS rule to find a matching QoS flow. However, PMF addresses are not known to the PCF so it is not possible to provide QoS rule for measurement messages. To solve this issue while minimizing system impact, reflective QoS mechanism may be used.

In order to support per QoS flow measurement, PMF messages for each QoS flow should use different address. Otherwise, PMF messages cannot be sent over different QoS flows. Different addresses can be assigned either in the UE or in the UPF. If the UPF assigns per QoS flow addresses, those multiple addresses may be sent over the NAS message. If there are many QoS flows to measure, the NAS signaling may be large. On the other hand, if the UE allocate per QoS flow addresses, it can be sent via user plane. Therefore, it is proposed as follows.

Proposal 4: The UE assigns PMF address information of the UE for each of QoS flows that requires measurements.

When the UPF sends PMF messages using PMF address for specific QoS flow, the UPF sets Reflective QoS Indication (RQI) in the N3/N9 header and send it over the specific QoS flow. Then the UE generates derived QoS rule for the PMF message and the UE can send PMF message over a specific QoS flow according to the derived QoS rule. Therefore, it is proposed as follows.

Proposal 4: The UPF includes RQI in N3/N9 header when it sends PMF messages over a specific QoS flow.

Hereinafter, a first method of the fifth disclosure will be described with reference to the drawings.

Figure 19:
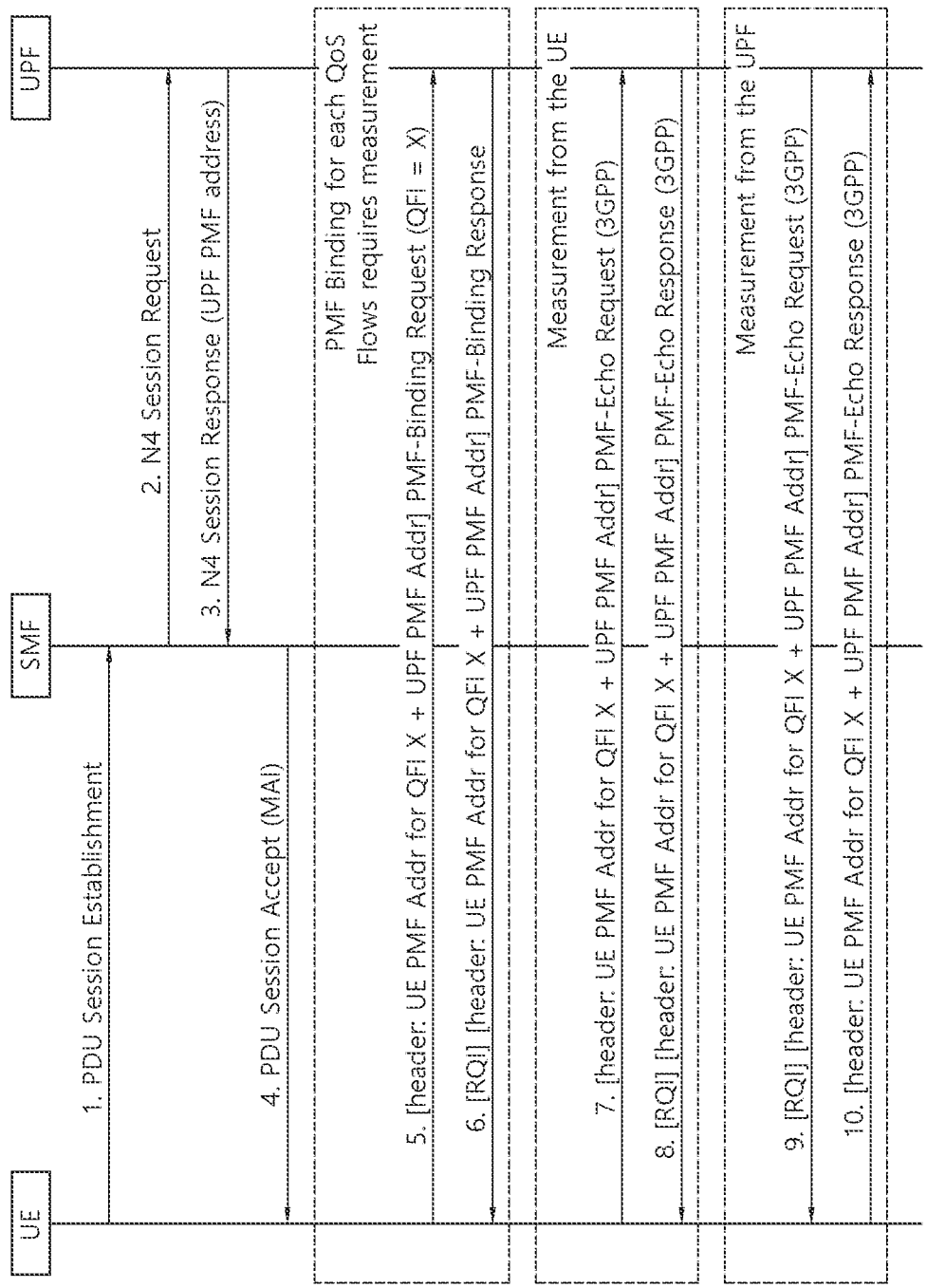
FIG. 19 is an exemplary diagram illustrating a signal flow according to the first method of the fifth disclosure.

FIG. 19 is an exemplary diagram illustrating a signal flow according to the first method of the fifth disclosure.

1) The UE transmits a MA PDU session establishment message to the SMF.

2) The SMF transmits a N4 session request message for the corresponding MA PDU session to the UPF.

3) The UPF transmits a N4 session response message including the PMF address of the UPF to the SMF.

4) The SMF transmits a PDU session accept message including Measurement

Assistance Information (MAI) to the UE. The MAI may include the following information.

A. The PMF address of the UPF

B. List of QoS flows that require measurement (e.g., QFI=X, QFI=Y)

5) When the UE received PDU session accept message including the MAI, the UE assigns PMF address of the UE for each of QoS flow identified in list included in the MAI. After that, the UE sends PMF-Binding Request using the assigned address for each of QoS flows in the MAI. The UE also includes QFI in the PMF-Binding Request message so that the UPF knows mapping between the QFI and PMF address of the UE.

6) The UPF stores the PMF address of the UE and QFI mapping information. The UPF transmits a PMF-Binding Response message to the UE. The message includes RQI in the N3/N9 encapsulation header. When the UE received the PMF-Binding Response message, according to the reflective QoS mechanism, the UE generates derived QoS rule.

7) If the UE wants to measure a specific QoS flow over 3GPP access, the UE sends PMF-Echo Request message using the PMF address of the UE for the QoS flow. The PMF-Echo Request message includes access type information (i.e., 3GPP).

8) The UPF sends the PMF-Echo Response message in response to the PMF-Echo Request message. The PMF-Echo Response message includes RQI in the N3/N9 encapsulation header. The UE resets the timer of the derived QoS rule.

9) If the UPF wants to measure a specific QoS flow over 3GPP access, the UPF sends PMF-Echo Request message using the PMF address of the UE for the QoS flow. The PMF-Echo Request message includes access type information (i.e., 3GPP). In addition, the UPF includes RQI in the N3/N9 encapsulation header.

The UE resets the timer of the derived QoS rule and send response message to the UPF.

V-2. Second Method of the Fifth Disclosure

When the UE supports ATS SS, the UE may receive Measurement Assistance Information (MAI), during the establishment of an MA PDU session. The MAI includes information whether and when measurement reports need to be sent by the UE to the network.

The MAI may include the PMF address information of the UPF. The PMF address information of the UPF may be used for sending PMF protocol messages by the UE. The address information is commonly used in both accesses. The MAI may also include the list of QoS flows the UE and UPF shall perform measurement.

If the UE receives the MAI, as soon as the MA PDU session is established, the UE may send PMF-Binding Request message to the UPF to provide PMF address information for each of the QoS flows in the MAI.

The UE may use different addresses (e.g., port, VID) for each of the QoS flows. The PMF-Binding Request message may include QoS flow information, i.e., QFI to provide mapping information between the PMF address of the UE and QFI. When the UPF receives the message, the UPF stores mapping between the PMF address of the UE and QFI and use it for PMF message exchange. After the PMF-Binding messages are exchanged, the UE and UPF may start measurements.

The UE and UPF performs access measurement by using the PMF message, which is exchanged between the UE and the UPF via user plane of the MA PDU session. The PMF message may include associated access type information.

In order to perform access network measurement over a specific QoS flow other than the QoS flow that is associated with default QoS rule, the network may use reflective QoS.

When the UPF sends PMF messages (e.g., PMF-Binding Response, PMF-Echo-Request and PMF-Echo-Response) to the UE, the UPF may include the RQI in the encapsulation header on N3 (and N9) interface. When the network performs measurement over a specific QoS flow, it is assumed that the UE sends PMF-Echo-Request messages more frequently than the reflective QoS Timer cycle.

In general, reflective QoS is used only for non-GBR QoS flows because GBR QoS flows requires resource reservation in the AN. However, in this case, the required resources for a GBR QoS flow may already be established via PDU session establishment or PDU session modification procedure. Therefore, this mechanism may also be used for GBR QoS flow.

The following PMF protocol messages may be exchanged between the UE and the PMF:

Messages for RTT measurements, e.g., when the "Smallest Delay" steering mode is used;

Messages for reporting access availability/unavailability by the UE to the UPF.

When the UE requests a MA PDU session and supports the MPTCP only, the network may not send Measurement Assistance Information as in this case the UE can use measurements available at the MPTCP layer.

V-2-1. RTT Measurement

If required by the ATSSS rules of a MA PDU session, RTT measurement may be conducted by the UE and UPF independently. There is no measurement reporting from one side to the other.

The estimation of the RTT by the UE or by the UPF is based on the following mechanism. The first entity (UE or UPF) sends an PMF-Echo Request message to the PMF address of the second entity. The second entity transmits a PMF-Echo Response message to the PMF address of the first entity. The first entity may derive an estimation of the average RTT over an access type by averaging the RTT measurements obtained over this access.

General Examples to which the Disclosure of the Present Specification can be Applied Some of the disclosures of the present specification as described above are summarized as follows.

According to a disclosure of the present specification, a method for Multi Access (MA) Protocol Data Unit (PDU) session by a User Equipment (UE) is provided. The method may include, based on a performance measurement function (PMF) address information of a User Plane Function (UPF) node included in Measurement Assistance Information (MAI), transmitting a first request message for a PMF binding request to a PMF layer of the UPF node. The PMF binding request may be performed for each Quality of Service (QoS) flow. The method may include receiving a PMF binding response message from the PMF layer of the UPF node. The PMF binding response message may include a Reflective QoS Indication (RQI). The method may include generating a derived QoS rule based on the RQI; and based on the derived QoS rule, performing a PMF Echo procedure via a QoS flow for which measurement is required.

The MAI may include information on QoS flows to be measured and a PMF address of the UPF node for each QoS flow.

The first request message for the PMF binding request may be transmitted for each QoS flow based on the MAI including the PMF address of the UPF node for each QoS flow.

The MAI may include information on QoS flows to be measured and only one PMF address of the UPF node for a plurality of QoS flows.

The UE may allocate its own PMF address for each QoS flow to be measured.

The performing of the PMF Echo procedure may comprise: transmitting a PMF Echo Request message to the UPF node; and receiving a PMF Echo Response message including an RQI from the UPF node. The PMF Echo Request message may be transmitted via the QoS flow for which the measurement is required. The PMF Echo Request message may be transmitted based on a PMF address of the UPF node for a corresponding QoS flow.

The performing of the PMF Echo procedure may comprise: receiving a PMF Echo Request message or a PMF Echo Response message including an RQI from the UPF node; and resetting a timer associated with the derived QoS rule.

The performing of the PMF Echo procedure may comprise: receiving a PMF Echo Request including the RQI message from the UPF node; and transmitting a PMF Echo Response message to the UPF node. The PMF Echo Request message may be transmitted via the QoS flow for which measurement is requested.

According to a disclosure of the present specification, a method for Multi Access (MA) Protocol Data Unit (PDU) session by a User Plane Function (UPF) node is provided. The method may include transmitting Measurement Assistance Information (MAI) including Performance Measurement Function (PMF) address information of the UPF node to a Session Management Function (SMF) node; receiving a first request message for a PMF binding request from a User Equipment (UE). The PMF binding request may be performed for each Quality of Service (QoS) flow. The method may include transmitting a PMF binding response message to the UE. The PMF binding response message may include a Reflective QoS Indication (RQI), which is used by the UE to create a derived QoS rule. The method may include, based on the derived QoS rule, performing a PMF Echo procedure via a QoS flow for which measurement is required.

The MAI may include a PMF address of the UPF node for each QoS flow.

The performing of the PMF Echo procedure may comprise: receiving a PMF Echo Request message from the UE; and transmitting a PMF Echo Response message to the UE. The PMF Echo Request message may be received via the QoS flow for which measurement is required.

The performing of the PMF Echo procedure may comprise: transmitting a PMF Echo Request message to the UE; and receiving a PMF Echo Response message from the UE. The PMF Echo Request message may be transmitted via the QoS flow for which measurement is requested.

According to a disclosure of the present specification, a method for Multi Access (MA) Protocol Data Unit (PDU) session by a Session Management Function (SMF) node is provided. The method may include receiving a PDU session establishment request message from a User Equipment (UE); receiving Measurement Assistance Information (MAI) including Performance Measurement Function (PMF) address information from a User Plane Function (UPF) node; and transmitting a PDU session establishment accept message including the MAI including address information of the UPF to the UE.

Hereinafter, an apparatus to which the above disclosure of the present specification can be applied will be described.

Figure 20:
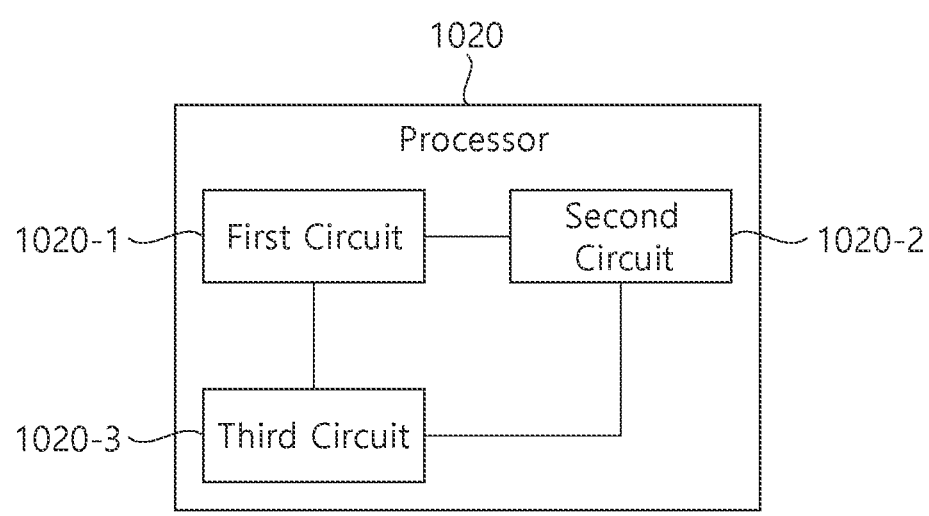
FIG. 20 shows a block diagram of a processor in which the disclosure of the present specification is implemented.

FIG. 20 shows a block diagram of a processor in which the disclosure of the present specification is implemented.

As can be seen with reference to FIG. 20, a processor 1020 in which the disclosure of the present specification is implemented includes a plurality of circuitry to implement the proposed functions, procedures and/or methods described in the present specification. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and includes at least one of a Digital Signal Processor (DSP), a Central Processing Unit (CPU), and a Graphics Processing Unit (GPU).

The processor may be included in the UE.

The first circuit 1020-1 of the processor may perform the step of receiving measurement assistance information from a Session Management Function (SMF) node. The measurement assistance information may be related to the MA PDU session on 3rd generation partnership project (3GPP) access and non-3GPP access. The second circuit 1020-2 of the processor may perform the step of transmitting a report based on the measurement assistance information. The report may include information on availability or unavailability of any one of the 3GPP access and the non-3GPP access. The report may be transmitted to a User Plane Function (UPF) node through a user plane.

The measurement assistance information may be received by being included in the PDU session establishment accept message.

The third circuit 1020-3 of the processor may detect the availability or unavailability of any one of the 3GPP access and the non-3GPP access.

The report may be transmitted from the UPF node to the SMF node.

Although not shown, the processor may further include a fourth circuit. The fourth circuit transmit a service request message over the non-3GPP access, based on (i) that the report needs to be sent and (ii) that the device is in an idle state on the non-3GPP access.

The processor may be included in the SMF node. In this case, the SMF node may include the processor; and at least one memory operably electrically connectable to the at least one processor and storing instructions. Operations to be performed based on the instructions being executed by the at least one processor, may include: transmitting Measurement Assistance Information (MAI) to a User Equipment (UE). The MAI may be related to the MA PDU session on 3rd Generation Partnership Project (3GPP) access and non-3GPP access. The operations may include receiving a report for the UE from a User Plane Function (UPF) node. The report may include information on the availability or unavailability of any one of the 3GPP access and the non-3GPP access within the MA PDU session. The operations may include performing traffic steering for the MA PDU session based on the received report.

The processor may be included in the SMF node. In this case, the SMF node may include the processor; and at least one memory operably electrically connectable to the at least one processor and storing instructions. Operations to be performed based on the instructions being executed by the at least one processor, may include: based on the inactive state of the user plane resource on any one of 3rd Generation Partnership Project (3GPP) access and non-3GPP access in which the MA PDU session is established for the User Equipment (UE), sending a first message to request reactivation for a user plane resource on the one access; receiving a second message from an Access and Mobility Management Function (AMF) node; and based on the second message being used to notify that the UE is unreachable on the at least one access, sending a third message including information indicating that the UE is unreachable on the at least one access.

Figure 21:
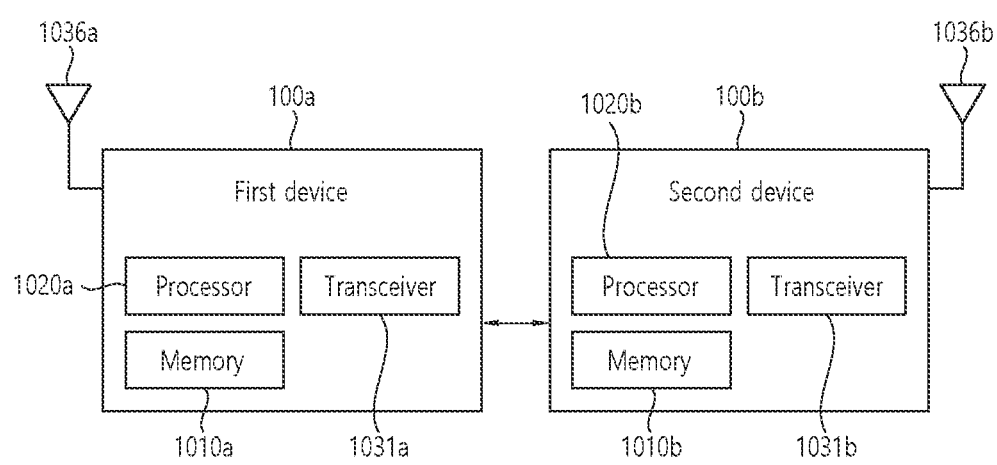
FIG. 21 illustrates a wireless communication system according to an embodiment.

FIG. 21 illustrates a wireless communication system according to an embodiment.

Referring to FIG. 21, the wireless communication system may include a first device 100a and a second device 100b.

The first device 100a may be a UE described in the disclosure of the present specification. Or, the first device 100a may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g., AMF or MME) described in the disclosure of the present specification. Or, the second device 100b may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 22:
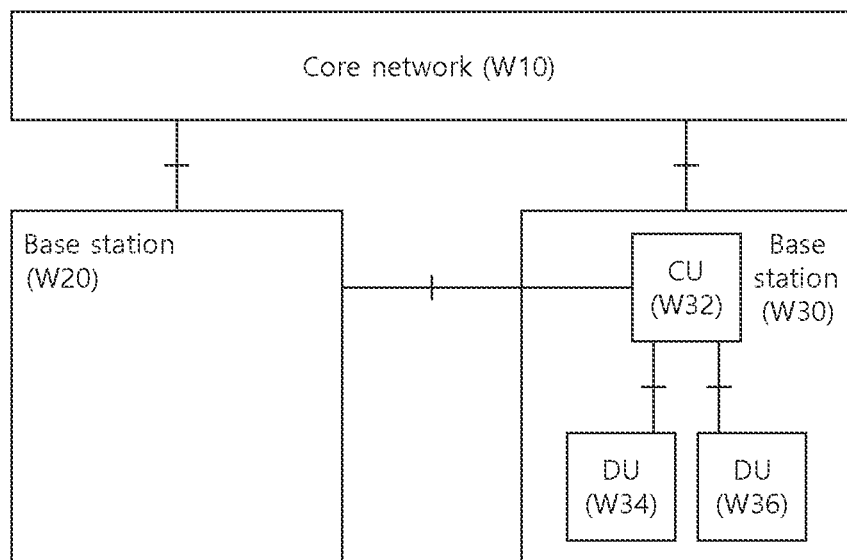
FIG. 22 illustrates a block diagram of a network node according to an embodiment.

FIG. 22 illustrates a block diagram of a network node according to an embodiment.

In particular, FIG. 22 is a diagram illustrating in detail a case in which a base station is divided into a Central Unit (CU) and a Distributed Unit (DU).

Referring to FIG. 22, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Orotocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 23:
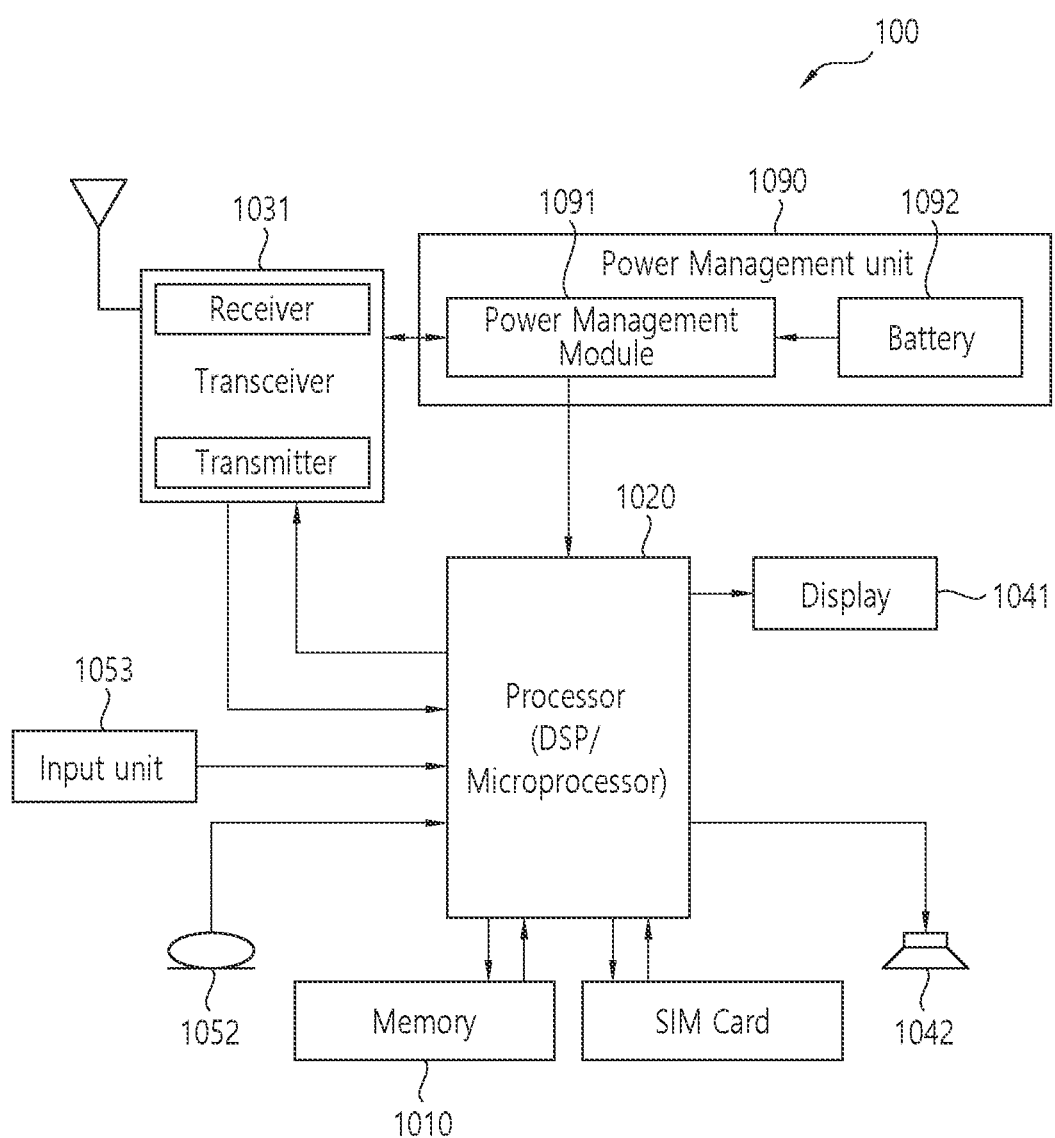
FIG. 23 is a block diagram illustrating a configuration of a UE according to an embodiment.

FIG. 23 is a block diagram illustrating a configuration of a UE according to an embodiment.

In particular, FIG. 23 is a diagram illustrating the UE of FIG. 20 above in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 24:
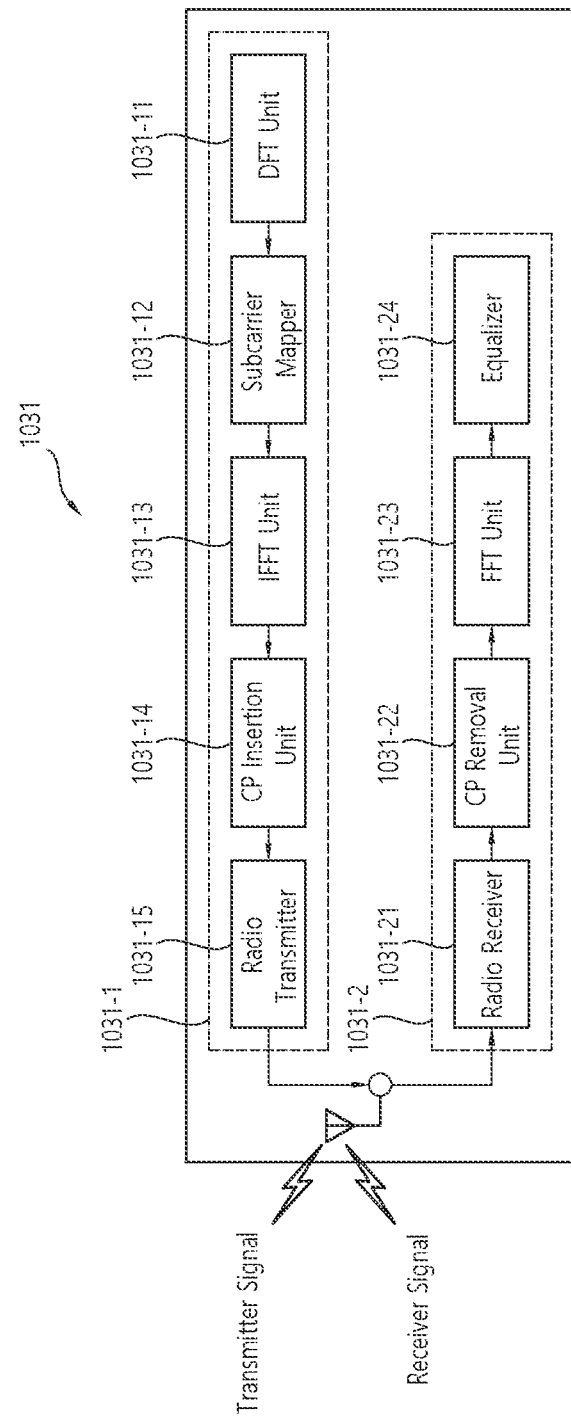
FIG. 24 is a detailed block diagram illustrating the transceiver of the first device shown in FIG. 21 or the transceiver of the device shown in FIG. 22 in detail.

FIG. 24 is a detailed block diagram illustrating the transceiver of the first device shown in FIG. 21 or the transceiver of the device shown in FIG. 22 in detail.

Referring to FIG. 24, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Scenario to which the Disclosure of the Present Specification can be Applied

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 25:
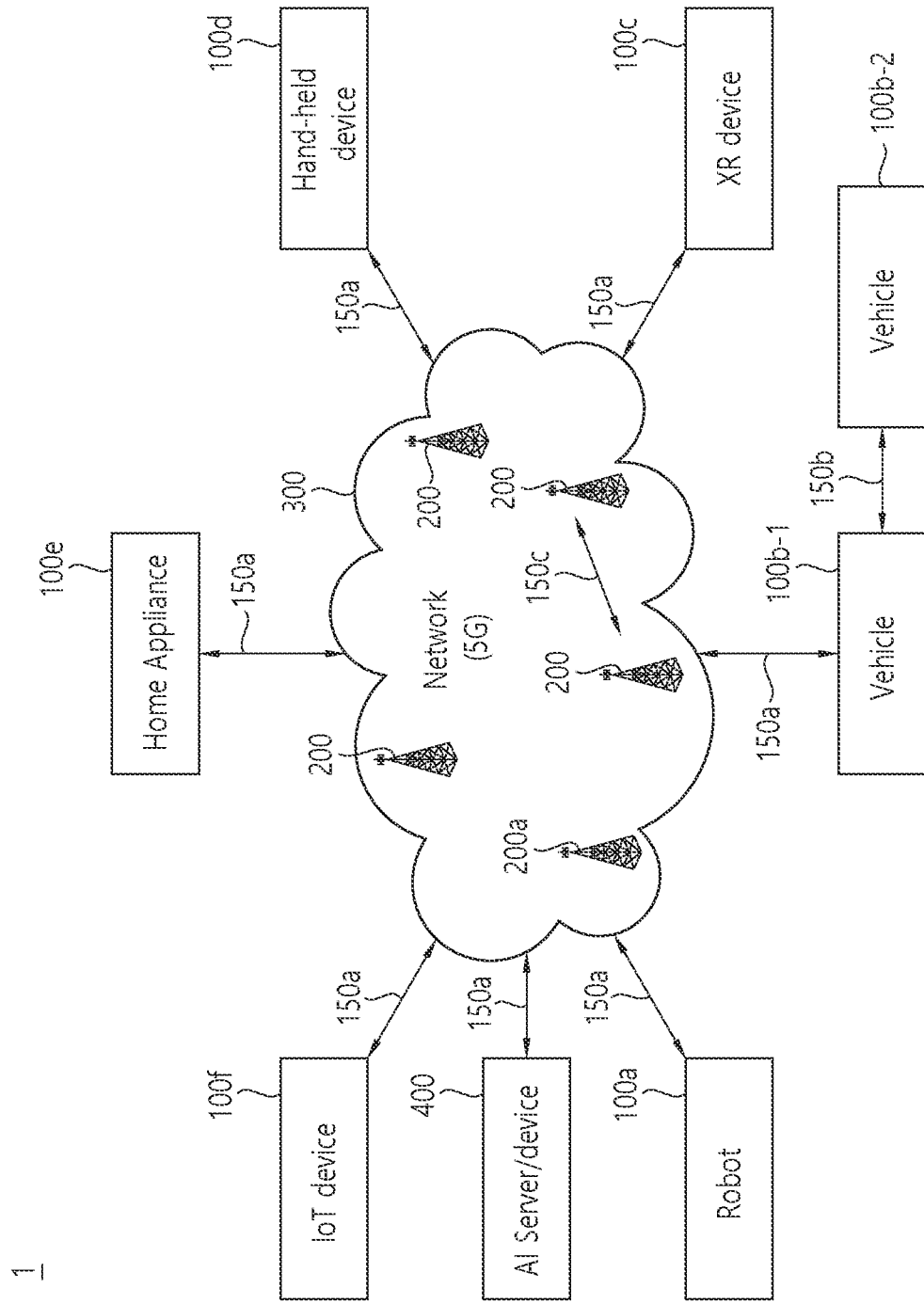
FIG. 25 illustrates a communication system 1 applied to the disclosure of the present specification.

FIG. 25 illustrates a communication system 1 applied to the disclosure of the present specification.

Referring to FIG. 25, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method performed by a User Equipment (UE), the method comprising:
    transmitting a Protocol Data Unit (PDU) session establishment request message to a Session Management Function (SMF) for establishing a Multi Access PDU session;
    receiving a PDU session establishment accept message from the SMF in response to the PDU session establishment request message,
    wherein the PDU session establishment accept message includes Measurement Assistance Information (MAI), and
    wherein the MAI includes i) a list of Quality-of-Service (QOS) flows for performance measurements and ii) address information of a Performance Measurement Function (PMF) in a User Plane Function (UPF) for each of the QoS flows; and
    performing a PMF Echo procedure with the UPF via one or more QoS flows from the list of QoS flows, based on the address information for the one or more QoS flows.

2. The method of claim 1, wherein the list of QoS flows includes a QoS Flow identifier (ID) of each of the QoS flows.

3. The method of claim 1, wherein the QoS flows for performance measurements are determined by the SMF.

4. The method of claim 1, wherein the address information includes User Datagram Protocol (UDP) port information or Media Access Control (MAC) address information.

5. The method of claim 1, wherein the PDU session establishment accept message further includes QoS rules for transmission of PMF messages.

6. The method of claim 1, wherein performing the PMF Echo procedure comprises:
    transmitting a PMF Echo Request message to the UPF; and
    receiving a PMF Echo Response message from the UPF in response to the PMF Echo Request message,
    wherein the PMF Echo Request message is transmitted via the one or more QoS flows, and
    wherein the PMF Echo Request message is transmitted based on the address information for the one or more QoS flows.

7. The method of claim 1, wherein performing the PMF Echo procedure comprises:
    receiving a PMF Echo Request message from the UPF; and
    transmitting a PMF Echo Response message to the UPF in response to the PMF Echo Request message,
    wherein the PMF Echo Request message is received via the one or more QoS flows, and
    wherein the PMF Echo Response message is transmitted based on the address information for the one or more QoS flows.

8. A method for Multi Access (MA) Protocol Data Unit (PDU) session performed by a User Plane Function (UPF), the method comprising:
    transmitting, to a Session Management Function (SMF), address information of a Performance Measurement Function (PMF) in a User Plane Function (UPF);
    receiving N4 rules including a list of Quality-of-Service (QOS) flows for performance measurements from the SMF; and
    performing a PMF Echo procedure with a User Equipment (UE) via one or more QoS flows from the list of QoS flows, based on the address information.

9. The method of claim 8, wherein performing the PMF Echo procedure comprises:
    receiving a PMF Echo Request message from the UE; and
    transmitting a PMF Echo Response message to the UE in response to the PMF Echo Request message,
    wherein the PMF Echo Request message is received via the one or more QoS flows.

10. The method of claim 8, wherein performing the PMF Echo procedure comprises:
    transmitting a PMF Echo Request message to the UE; and
    receiving a PMF Echo Response message from the UE in response to the PMF Echo Request message,
    wherein the PMF Echo Request message is transmitted via the one or more QoS flows.

11. A User Equipment (UE) comprising:
    at least one processor;
    at least one memory operably electrically connectable to the at least one processor and storing instructions that, based on being executed by the at least one processor, perform operations comprising:
    transmitting a Protocol Data Unit (PDU) session establishment request message to a Session Management Function (SMF) for establishing a Multi Access PDU session;
    receiving a PDU session establishment accept message from the SMF in response to the PDU session establishment request message,
    wherein the PDU session establishment accept message includes Measurement Assistance Information (MAI), and
    wherein the MAI includes i) a list of Quality-of-Service (QOS) flows for performance measurements and ii) address information of a Performance Measurement Function (PMF) in a User Plane Function (UPF) for each of the QoS flows; and
    performing a PMF Echo procedure with the UPF via one or more QoS flows from the list of QoS flows, based on the address information for the one or more QoS flows.

12. The UE of claim 11, wherein the list of QoS flows includes a QoS Flow identifier (ID) of each of the QoS flows.

13. The UE of claim 11, wherein the QoS flows for performance measurements are determined by the SMF.

14. The UE of claim 11, wherein the address information includes User Datagram Protocol (UDP) port information or Media Access Control (MAC) address information.

15. The UE of claim 11, wherein the PDU session establishment accept message further includes QoS rules for transmission of PMF messages.

* * * * *